US012772107B2

(12) United States Patent
Vasas et al.

(10) Patent No.: US 12,772,107 B2
(45) Date of Patent: Oct. 20, 2026

(54) TECHNIQUE FOR TRIGGERING CONGESTION MITIGATION ACTIONS IN AN O-RAN-COMPLIANT COMMUNICATION NETWORK

(71) Applicant: Telefonaktiebolaget LM Ericsson (publ), Stockholm (SE)

(72) Inventors: Róbert Vasas, Budapest (HU); Alexander Biro, Budapest (HU); Attila Mitcsenkov, Budapest (HU); Attila Báder, Paty (HU)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 76 days.

(21) Appl. No.: 18/840,078

(22) PCT Filed: Mar. 25, 2022

(86) PCT No.: PCT/EP2022/057961
§ 371 (c)(1),
(2) Date: Aug. 21, 2024

(87) PCT Pub. No.: WO2023/179871
PCT Pub. Date: Sep. 28, 2023

(65) Prior Publication Data
US 2025/0175852 A1 May 29, 2025

(51) Int. Cl.
*H04W 28/02* (2009.01)

(52) U.S. Cl.
CPC ................................ *H04W 28/0289* (2013.01)

(58) Field of Classification Search
CPC .......................... H04W 28/0289; H04W 28/02
See application file for complete search history.

(56) References Cited

U.S. PATENT DOCUMENTS

2011/0280130 A1* 11/2011 Foottit .................. H04W 28/02 370/236
2016/0044530 A1* 2/2016 Cheng ............... H04W 28/0289 370/235

(Continued)

FOREIGN PATENT DOCUMENTS

WO WO-2020242987 A1 * 12/2020 ............ H04W 36/22

OTHER PUBLICATIONS

"Understanding O-RAN: Architecture, Interfaces, Algorithms, Security, and Research Challenges", Polese et al. (supplied by Applicant) Feb. 2022, p. 4. (Year: 2022).*

(Continued)

*Primary Examiner* — Richard G Keehn
(74) *Attorney, Agent, or Firm* — Baker Botts L.L.P.

(57) ABSTRACT

A technique of triggering one or more congestion mitigation actions in a communication network is presented. The communication network comprises a core network domain and a cellular RAN domain having an O-RAN architecture. A method implementation comprises evaluating a temporal behavior of at least one congestion indicator for individual cells in the RAN domain to identify one or more candidate cells that are prone to suffering from congestion. The method also comprises correlating, for at least one of the one or more candidate cells, session-related information from the core network domain with RAN information from the RAN domain to derive at least one quality indicator for the at least one candidate cell. Further, the method comprises triggering, dependent on the at least one quality indicator derived for the at least candidate cell, one or more congestion mitigation actions.

20 Claims, 22 Drawing Sheets

(56) References Cited

U.S. PATENT DOCUMENTS

| | | | | |
|---|---|---|---|---|
| 2017/0208016 | A1* | 7/2017 | Lehane | H04L 67/1031 |
| 2017/0311198 | A1* | 10/2017 | Monjas Llorente | H04W 28/0289 |
| 2019/0327660 | A1* | 10/2019 | Hong | H04W 40/22 |
| 2021/0160740 | A1* | 5/2021 | Kim | H04W 28/0268 |
| 2022/0159525 | A1* | 5/2022 | Chou | H04W 28/0862 |
| 2025/0247908 | A1* | 7/2025 | Zhang | H04W 56/0015 |

OTHER PUBLICATIONS

International Search Report and Written Opinion issued for PCT/EP2022/057961 mailed on Oct. 26, 2022.

Michele Polese et al., "Understanding O-RAN: Architecture, Interfaces, Algorithms, Security, and Research Challenges", arxiv.org, Cornell University Ithaca, NY 14853, Feb. 2, 2022 [online] https://arxiv.org/pdf/2202.01032.pdf, retrieved Mar. 21, 2024, 33 pages.

Solmaz Niknam et al., "Intelligent O-RAN for Beyond 5G and 6G Wireless Networks", arxiv.org, Cornell University Ithaca, NY 14853, May 17, 2020 [online] https://arxiv.org/pdf/2005.08374.pdf, retrieved Mar. 21, 2024, 7 pages.

O-RAN Alliance e.V., "O-RAN Working Group 1 Use Cases Analysis Report", Technical Report, O-RAN.WG1.Use-Cases-Analysis-Report-v04.00, 49 pages.

O-RAN Alliance e.V., "O-RAN Working Group 1 Use Cases Detailed Specification", Technical Report, O-RAN.WG1.Use-Cases-Detailed-Specification-v04.00, 71 pages.

O-RAN Alliance e.V., "O-RAN Architecture Description", Technical Specification, O-RAN.WG1.O-RAN-Architecture-Description-v03.00, 32 pages.

* cited by examiner

TECHNIQUE FOR TRIGGERING CONGESTION MITIGATION ACTIONS IN AN O-RAN-COMPLIANT COMMUNICATION NETWORK

TECHNICAL FIELD

The present disclosure generally relates to communication networks. In particular, a technique for triggering congestion mitigation actions in a communication network with a core network domain and a cellular radio access network (RAN) domain having an Open RAN (O-RAN) architecture is presented. The technique may be implemented as a method, a computer program product, an apparatus or a system.

BACKGROUND

The O-RAN ALLIANCE is a community of mobile network operators (MNOs) and RAN vendors that aims at an open, intelligent, virtualized and fully interoperable RAN. O-RAN targets at improving the efficiency of RAN deployments and operations. In order to realize these objectives, the community defines an O-RAN architecture which identifies the key functions and interfaces, and associated specifications are published by several working groups (WGs). The O-RAN standardization efforts are based on the principle that its architectural specifications shall be consistent with the architectural specifications of the 3$^{rd}$ Generation Partnership Project (3GPP) to the extent possible. This consistency paradigm applies in particular to the interface specifications.

FIG. 1 illustrates the high-level O-RAN architecture 100 as defined in O-RAN-WG1.ORAN-Architecture-Description-v05.00 of 16 Jul. 2021. As shown in FIG. 1, there exist four key interfaces—namely, A1, O1, Open Fronthaul M-plane and O2—to connect a Management and Orchestration (SMO) framework 110 to O-RAN network functions 120 hosted by an O-Cloud 130.

The O-Cloud 130 is a cloud computing platform and contains a collection of physical infrastructure nodes that meet O-RAN requirements to host the relevant O-RAN functions (such as a Near-Real Time RAN Intelligent Controller 140), the supporting software components (such as the operating system, a virtual machine monitor, etc.) and the appropriate management and orchestration functions.

The SMO framework 110 contains a Non-Real Time RAN Intelligent Controller (RIC) 150 coupled via the A1 interface to the Near-RT RIC 140 comprised by the O-RAN network functions 120. The O-RAN network functions 120 further comprise an O-RAN radio unit (O-RU) 160 as a logical node hosting Low-PHY layer and radio frequency (RF) processing functions.

As illustrated in FIG. 1, there exists an NG (Next Generation) interface between the O-RAN network functions 120 and an NG-Core 170. Furthermore, there exists an interface which connects external systems 180 to the SMO framework 110. The external systems 180 are configured to provide enrichment data to the SMO framework 110.

The O-RAN-WG1.ORAN-Architecture-Description-v05.00 as referenced above defines multiple control loops operable in different time regimes, including:

- a real time (RT) control loop (time regime<10 ms).
- a near-RT RIC control loop (time regime between 10 ms and 1000 ms)
- a non-RT RIC control loop (time regime>=1000 ms)

In the O-RAN architecture, the SMO framework 110 is responsible for RAN domain management. The three key capabilities of the SMO framework 110 that provide RAN support in the O-RAN architecture include the provision of a fault, configuration, accounting, performance and security (FCAPS) service via a dedicated FCAPS interface to the O-RAN network functions 120 (including performance management, configuration management, fault management, etc.). Further key capabilities include the non-RT RIC 150 for RAN optimization and O-Cloud 130 management and orchestration.

The O-RAN specifications do not define any formal interface from the SMO framework 110 towards the non-RT RIC 150. An implementation of the SMO framework 110, therefore, may make its own design choice for creating a boundary towards the non-RT RIC 150, or choose not to implement a clear boundary at all.

The primary task of the non-RT RIC 150 is to support intelligent RAN optimization by providing policy-based guidance, machine learning (ML) model management and enrichment information to the near-RT RIC 140 so that the RAN domain can optimize, for example, radio resource management (RRM) under certain conditions. The non-RT RIC 150 can also implement an intelligent radio resource management function over a non-RT interval (i.e., over an interval greater than 1 second). The non-RT RIC 150 can use data analytics and artificial intelligence (AI) or ML training and inference to determine RAN optimization actions for which it can leverage SMO services such, as data collection and service provisioning of O-RAN nodes.

The non-RT RIC 150 has two sub-functions. The first sub-function is the so-called non-RT RIC framework, a functionality internal to the SMO framework 110 that logically terminates the A1 interface and exposes the required services to non-RT RIC applications (rApps) through an R1 interface. The non-RT RIC framework is responsible for exposing all required functionalities to the rApps. The second sub-function comprises the rApps, namely modular applications that leverage the functionality exposed by the non-RT RIC framework to perform RAN optimization and other functions via the A1, O1, O2 and R1 interfaces.

O-RAN WG1 ("Use Cases and Overall Architecture Working Group") has released high-level use case descriptions in O-RAN.WG1.Use-Cases-Analysis-Report-v-06-00 of 19 Jul. 2021. One of the use cases discussed therein ("Use Case 16") relates to congestion prediction and management in the O-RAN architecture. In more detail, Use Case 16 proposes a proactive approach to congestion handling in the RAN domain by analyzing the radio resource utilization and taking timely corrective actions so as to mitigate any potential congestion in the system.

It has been realized by O-RAN WG1 that network congestion is a challenging problem for MNOs as it directly affects user experience. An MNO has several possibilities to handle network congestion in the RAN domain, including traffic offloading (e.g., across different carriers or to other communication technologies such as Wi-Fi, etc.) and antenna-based congestion mitigation actions (e.g., cell splitting, higher-order multiple-input multiple-output, MIMO, modes, etc.). It has, however, been found that the congestion patterns in the network are often not fully understood and that congestion mitigation is often triggered too late, at the expense of a prolonged degradation of user experience).

The main objection of Use Case 16 is to use the embedded intelligence of O-RAN to predict the congestion "ahead of time", so that MNOs can trigger a cell congestion mitigation action before the congestion is predicted to happen. To this end, Use Case 16 proposes a so-called Congestion Prediction and Management (CPM) architecture to detect and mitigate congestion pro-actively. In the CPM architecture, RAN information is collected by a data collector function of the SMO framework 110 and over the O1 interface (see FIG. 1). After pre-processing, such as by converting RAN counter information into key performance indicators (KPIs), the resulting data is shared with the non-RT RIC 150 (that can be deployed in the SMO framework 110 using a data sharing entity). The non-RT RIC 150 will invoke a corresponding training model or training application on an AI server inside or outside the SMO framework 110. There, data cleaning and training will happen, and predicted KPIs will be returned to a CPM rApp in the non-RT RIC 150. In this regard, ML models can be used to learn and predict future traffic for the next hour, day or month. A prediction window can be configured by MNOs depending on the available data and data periodicity.

The CPM rAPP in the non-RT RIC 150 will define a certain inference logic to detect cell congestion. An exemplary inference logic can be implemented as follows:

1. Average user-perceived Internet Protocol (IP) throughput<P Mbps
2. Downlink physical resource block (PRB) utilization>Q %
3. Average radio resource control users>R.

The output of the inference logic may contain cell identifiers, information about whether a particular cell is congested or not, a time stamp of cell congestion and a predicted KPI value (to decide about a severity of a congestion). In view of the CPM rApp information in the non-RT RIC 150, Use Case 16 defines two options to mitigate cell congestion:

According to option a), the CPM rApp in the non-RT RIC 150 transfers the congestion inference output to a CPM rApp in the near-RT RIC 140 through the A1 interface. The near-RT RIC 140 may then decide about congestion mitigation actions taking into the congestion inference output. Suitable actions include switching to a dual-connectivity mode, debarring user access and load sharing.

According to option b), the non-RT RIC 150 can also directly assist in congestion mitigation via the O1 interface. Suitable assisting actions include a cell splitting (assuming available hardware support), adding of more carriers, switching to a higher-order MIMO mode, and switching some of the users to Wi-Fi.

It is expected that the congestion prediction and mitigation approaches defined in Use Case 16 will not be satisfactory from various perspectives. For example, it can already be envisaged now that there will exist congestion scenarios that either cannot be properly predicted or not properly mitigated within the framework of Use Case 16.

SUMMARY

Accordingly, there is a need for a more efficient congestion mitigation technique in a communication network with an O-RAN-based RAN domain.

According to a first aspect, a method of triggering one or more congestion mitigation actions in a communication network is provided. The communication network comprises a core network domain and a cellular RAN domain having an O-RAN architecture. The method comprises evaluating a temporal behavior of at least one congestion indicator for individual cells in the RAN domain to identify one or more candidate cells that are prone to suffering from congestion. The method also comprises correlating, for at least one of the one or more candidate cells, session-related information from the core network domain with RAN information from the RAN domain to derive at least one quality indicator for the at least one candidate cell. Further, the method comprises triggering, dependent on the at least one quality indicator derived for the at least candidate cell, one or more congestion mitigation actions.

Also provided is a computer program product comprising program code portion for performing the steps of any method aspect presented herein when the computer program product is executed by at least one processor. The computer program product may be stored on a computer-readable medium.

A further aspect is directed at an apparatus for triggering one or more congestion mitigation actions in a communication network comprising a core network domain and a cellular RAN domain having an O-RAN architecture. The apparatus is configured to evaluate a temporal behavior of at least one congestion indicator for individual cells in the RAN domain to identify one or more candidate cells that are prone to suffering from congestion. The apparatus is further configured to correlate, for at least one of the one or more candidate cells, session-related information from the core network domain with RAN information from the RAN domain to derive at least one quality indicator for the at least one candidate cell. Further still, the apparatus is configured to trigger, dependent on the at least one quality indicator derived for the at least candidate cell, one or more congestion mitigation actions.

The triggering apparatus may be configured to perform the steps of any method aspect presented herein.

Another aspect of the present disclosure relates to an O-RAN system comprising the triggering apparatus presented herein.

BRIEF DESCRIPTION OF THE DRAWINGS

Further aspects, details and advantages of the present disclosure will become apparent from the detailed description of exemplary embodiments below and from the drawings, wherein.

DETAILED DESCRIPTION

Figure 1:
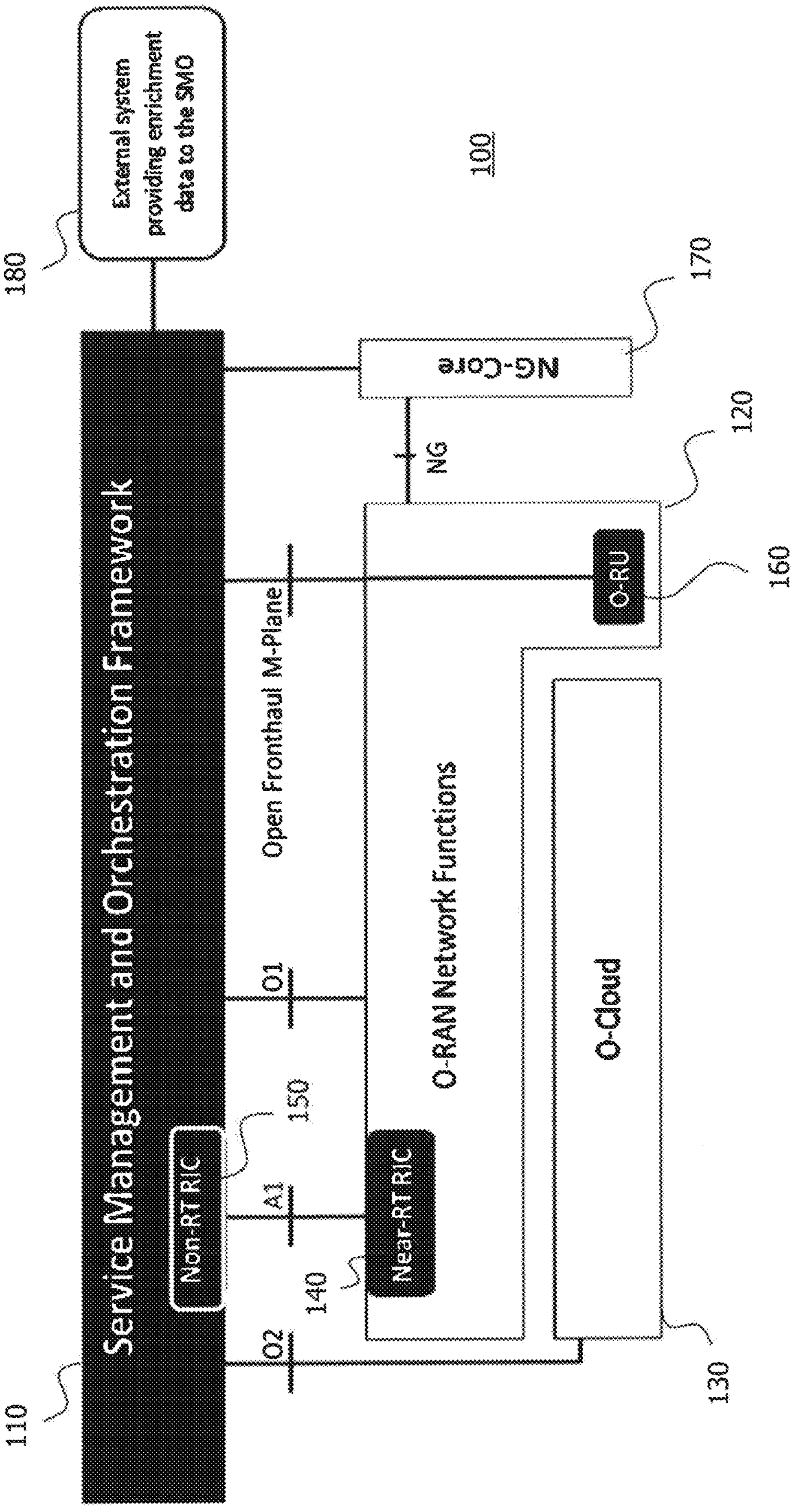
FIG. 1 is a schematic diagram illustrating the O-RAN architecture.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein may be implemented using individual hardware circuits, using soft-ware functioning in conjunction with a programmed microprocessor or general purpose computer, using one or more application specific integrated circuits (ASICs) and/or using one or more digital signal processors (DSP). It will also be appreciated that when the present disclosure is described in terms of a method, it may also be embodied in one or more processors and one or more memories coupled to the one or more processors, wherein the one or more memories store one or more computer programs that perform the steps, services and functions disclosed herein when executed by the one or more processors.

It has been found that quality indicators, particularly from a user or service perspective, are not taken into account in the congestion prediction and mitigation proposal as set out in O-RAN.WG1.Use-Cases-Analysis-Report-v-06-00 of 19 Jul. 2021. For example, the throughput measure proposed therein does not reflect well the actual service quality because different services may have different throughput requirements. Moreover, even if there are throughput limitations it is not known how the end user experience of a particular service is affected.

Also multiservice aspects are presently not taken into account in the congestion prediction and mitigation proposal as set out in O-RAN.WG1.Use-Cases-Analysis-Report-v-06-00. Mobile networks of, for example, the $5^{th}$ Generation (5G) serve multiple type of services at the same time. Proper service classification is not possible purely in the RAN domain. For example, RAN domain counters are not available per service. Different services can contribute to congestion at different levels. Lack of corresponding knowledge can lead to suboptimal congestion mitigation actions. As a result, congestion mitigation actions may be taken for cells where services are not affected, or congestion mitigation actions are not effected for cells where services are degraded. Moreover, since latency and time resolution of counter information gathered in the RAN domain is high, congestion detection in short time frames is not foreseen.

It has also been realized that congestion mitigation actions for congested cells can have unwanted side effects. Therefore, it may be desirable to perform a particular congestion mitigation action only for limited number of cells in the RAN domain. In other scenarios, congestion mitigation actions may be effected only for one or more dedicated subscriber groups and/or for specific services. In the congestion prediction and mitigation proposal as set out in O-RAN.WG1.Use-Cases-Analysis-Report-v-06-00, it is not foreseen to distinguish different subscriber groups and apply different congestion mitigation actions for different subscriber groups. Also, it is not possible to distinguish different types of services and, as a result, it is impossible to enforce congestion mitigation actions for only certain services. As understood herein, a service type, or simply "service", may be defined by a certain service provider (e.g., Google, YouTube or Facebook), by a certain service functionality (e.g., video, voice or web browsing) or by a combination of service provider and service functionality (e.g., YouTube—video).

In variants of the present disclosure, using a quality evaluation based on data records that correlate "per-session" information from the core network domain with RAN information from the RAN domain permits an efficient cell congestion prediction and mitigation in longer but also in shorter time frames. In certain variants, closed-loop congestion mitigation actions may be triggered for preventing or reducing congestion. Using, in some variants, an RAN information-based congestion prediction, possibly applying ML methods, candidate cells may be identified in an early phase, and one or more quality indicators may then be used in a later phase to identify actual congestion situations. When deriving session-related information from the core network domain, for example with respect to a type of service and/or type of subscriber associated with a particular session, a correlation with RAN information may allow differentiating the RAN information, for example regarding the actually used services types and/or the types of affected subscribers. The corresponding information may then be taken into account to select and trigger one or more suitable (e.g., closed-loop) congestion mitigation actions. Identifying congestion, identifying affected subscribers and/or affected services, and, optionally, identifying a possible congestion root cause based on per-session correlated information (e.g., event data) from the RAN and the core network domain leads to improved congestion mitigation actions, in particular when mitigating congestion in a closed-loop manner either in the RAN or core network domain (or in both domains in parallel) depending on one or more of the affected subscriber type, the affected service types and a possible root cause.

In the following description of exemplary embodiments, the same reference numerals denote the same or similar components.

Figure 2:
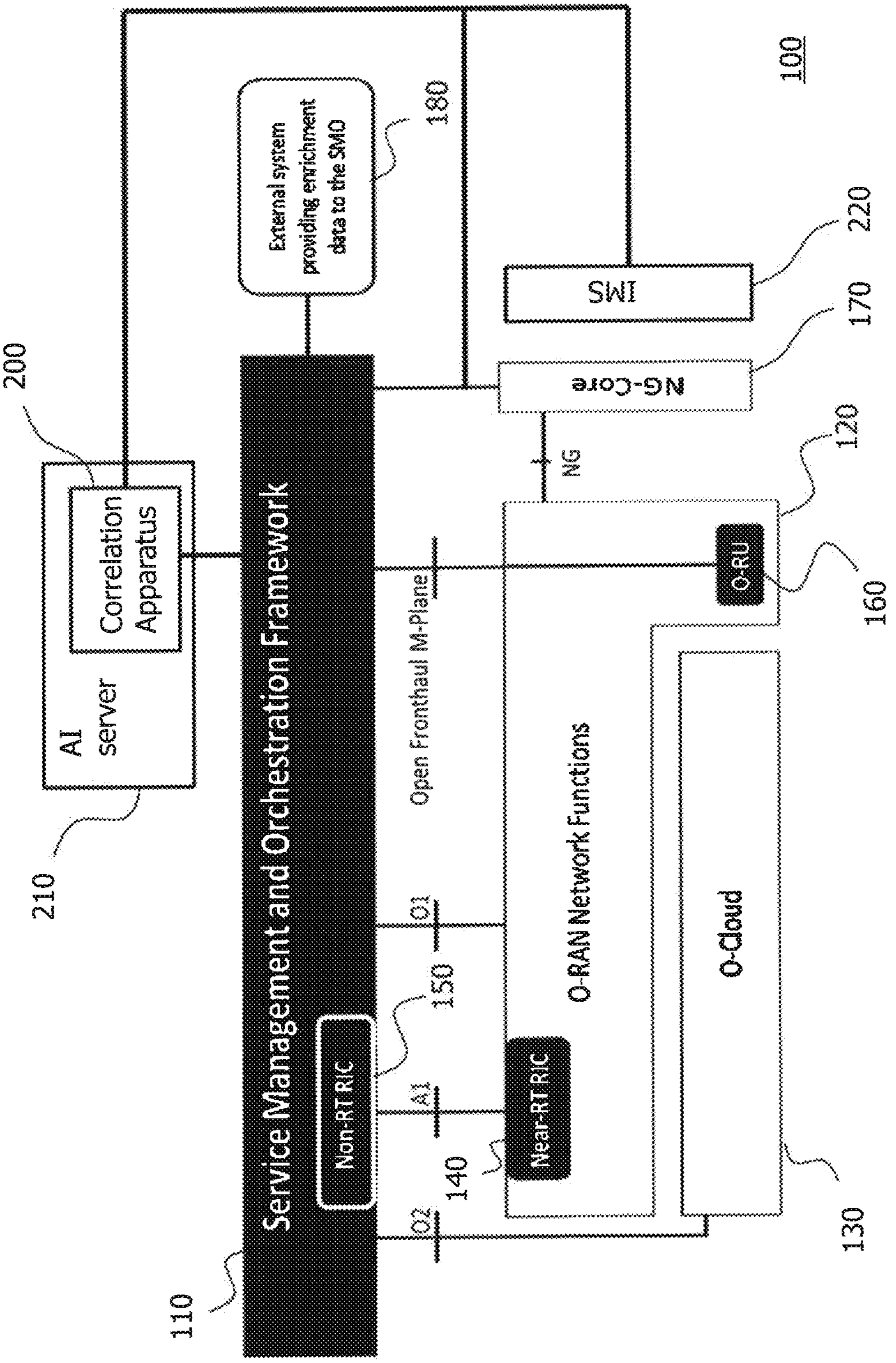
FIG. 2 is a schematic diagram illustrating a first approach for extending the O-RAN architecture in accordance with the present disclosure.
Figure 3:
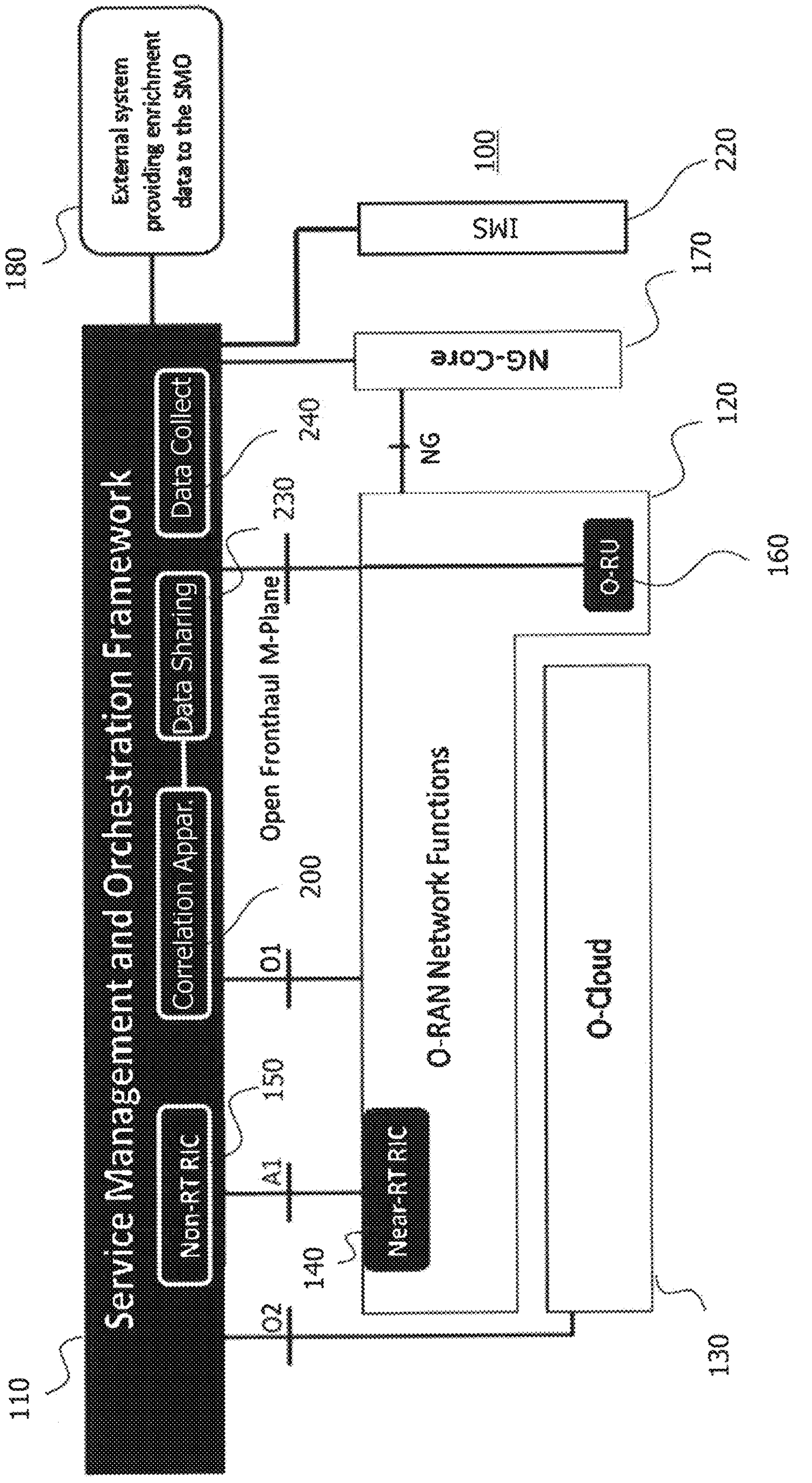
FIG. 3 is a schematic diagram illustrating a second approach for extending the O-RAN architecture in accordance with the present disclosure.

FIGS. 2 and 3 illustrate different variants of an extended O-RAN architecture 100 according to the present disclosure. The core feature of the extended O-RAN architecture 100 in the context of congestion evaluation and mitigation as proposed herein is a correlation apparatus 200 configured to correlate session-related information from the core network domain (such as from the NG-Core 170) with RAN information from the RAN domain (such as from the O-RAN network functions 120) for arriving at more focussed congestion mitigation actions.

In the extended O-RAN architecture 100 of FIG. 2, the correlation apparatus 200 is installed on an AI server 210. The AI server 210 may be realized on a private or a public cloud. The AI server 210 has at least one interface to the core network domain, namely to the (e.g., 5G-compliant) NG-Core 170 and to an IP multimedia subsystem (IMS) 220 (i.e., a core packet network extension for supporting voice communication). The AI server 210 has another interface to the SMO framework 110 (and, thus, to the O-RAN network functions 120).

In the extended O-RAN architecture 100 of FIG. 3, the correlation apparatus 200 is implemented within the SMO framework 110. In the scenario of FIG. 3, the correlation apparatus 200 is configured to make use of the data collection and data sharing functionalities of the SMO framework 110, whereas in the scenario of FIG. 2, those functionalities may be offered by the SMO framework 110 to the AI server 210 and, thus, to the correlation apparatus 200 installed thereon.

Figure 4:
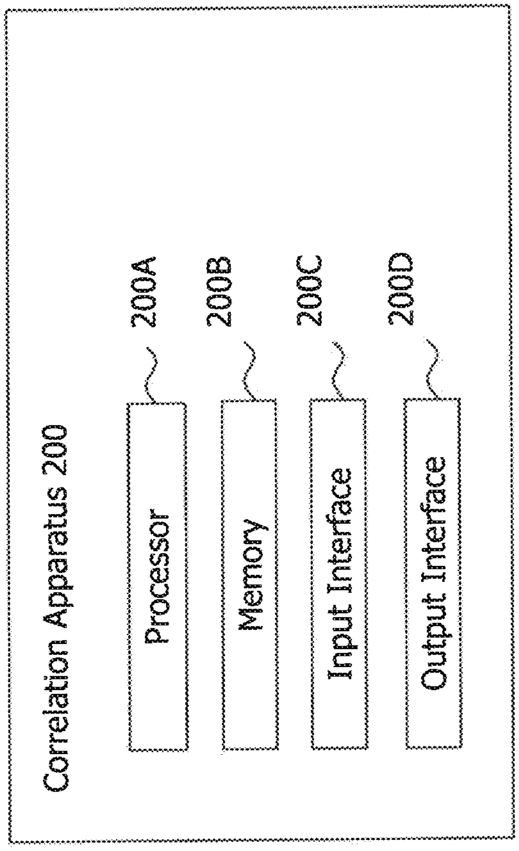
FIG. 4 is a schematic diagram of an apparatus realization in accordance with the present disclosure.

FIG. 4 illustrates an exemplary configuration of the correlation apparatus 200 as illustrated in FIGS. 2 and 3. The apparatus 200 comprises a processor 200A and a memory 200B coupled to the processor 200A. The memory 200B stores program code that configures operation of the processor 200A in accordance with the method aspects of the present disclosure. The processor 200A and the memory 200B may be realized using cloud computing resources or dedicated hardware components.

The correlation apparatus 200 further comprises at least one input interface 200C and at least one output interface 200D. The input and output interfaces 200C, 200D may be configured and directed as illustrated in FIGS. 2 and 3 for the AI server 210.

In the following, operation of the processor 200A will be discussed with reference to the flow diagram 500 of FIG. 5 and the exemplary congestion diagram 600 of FIG. 6.

Figure 5:
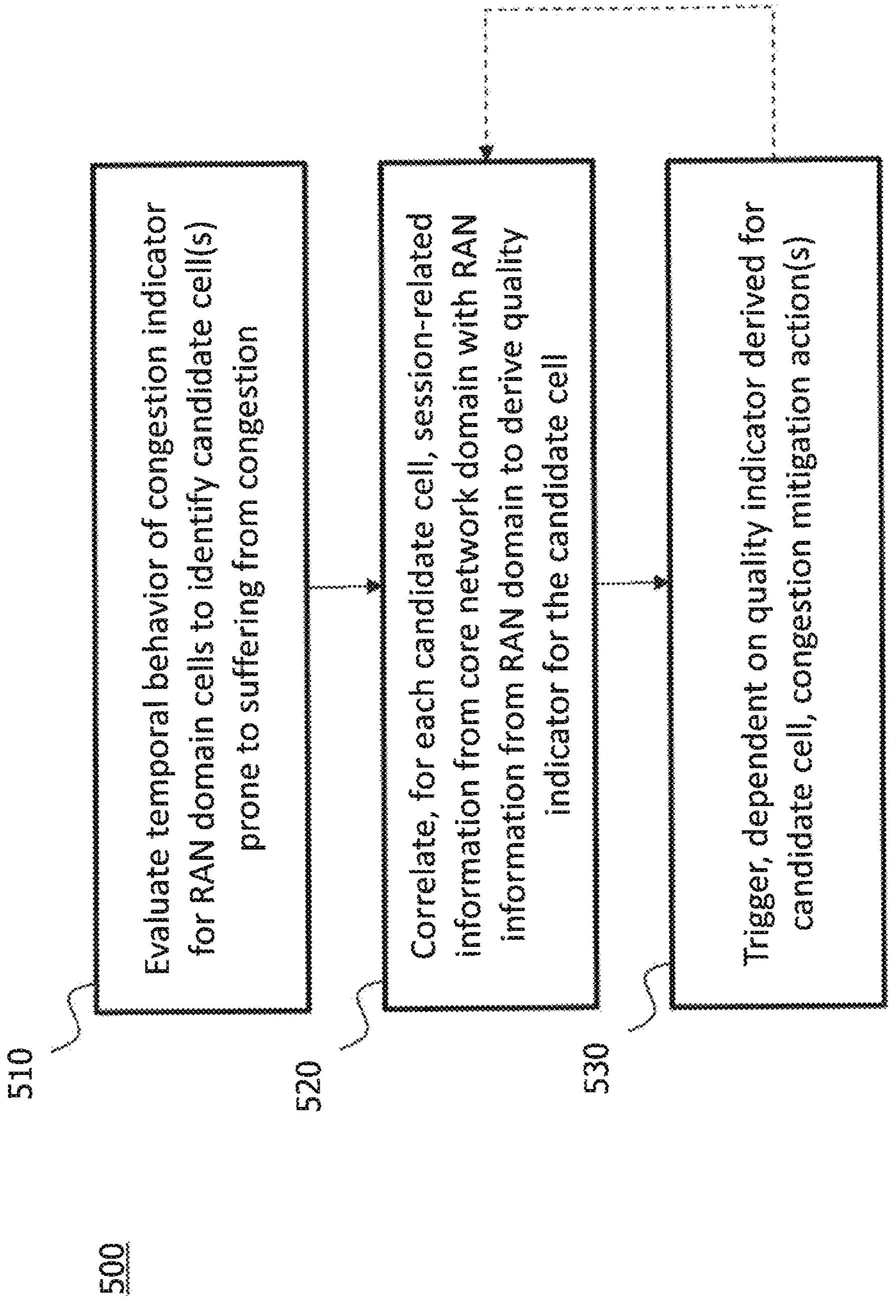
FIG. 5 is a flow diagram of a method realization in accordance with the present disclosure.

The flow diagram 500 of FIG. 5 illustrates a method of triggering one or more congestion mitigation actions in a communication network configured in accordance with the extended O-RAN architecture 100 of FIG. 2. As such, the communication network includes a core network domain (here: comprising at least the NG-Core 170 and the IMS 220) and a cellular RAN domain (here: including the O-RAN network functions 120).

The method illustrated in FIG. 5 comprises a step 510 of evaluating a temporal behavior of at least one congestion indicator for individual cells in the RAN domain to identify one or more candidate cells (e.g., a list of candidate cells) that are prone to suffering from congestion. Evaluating the temporal behavior of the at least one congestion indicator may comprise a prediction, and in particular a temporal extrapolation of the at least one congestion indicator. A threshold decision may be applied to the, or each, congestion indicator to determine whether or not a particular cell is a candidate cell. Evaluating the temporal behavior of the at least one congestion indicator may comprise applying an ML algorithm.

As will be explained in greater detail below, evaluating the temporal behavior of the at least one congestion indicator in step 510 may in certain variants comprise one or both of a short-term prediction (e.g., for a time period of less then an hour) and a long-term prediction (e.g., for a time period of more than an hour). In the context of long-term prediction, regular fluctuations in the RAN information may be filtered out. Moreover, in the context of long-term prediction for a possible candidate cell, RAN information gathered for at least one neighboring cell of the possible candidate cell may be evaluated. In the context of short-term prediction, a probabilistic model may be applied and/or cell trace events may be evaluated.

In step 510, information gathered in the RAN domain is evaluated. In some variants, the evaluation in step 510 is not based on any information gathered in the core network domain, as will now be explained with reference to the congestion diagram of FIG. 6.

Figure 6:
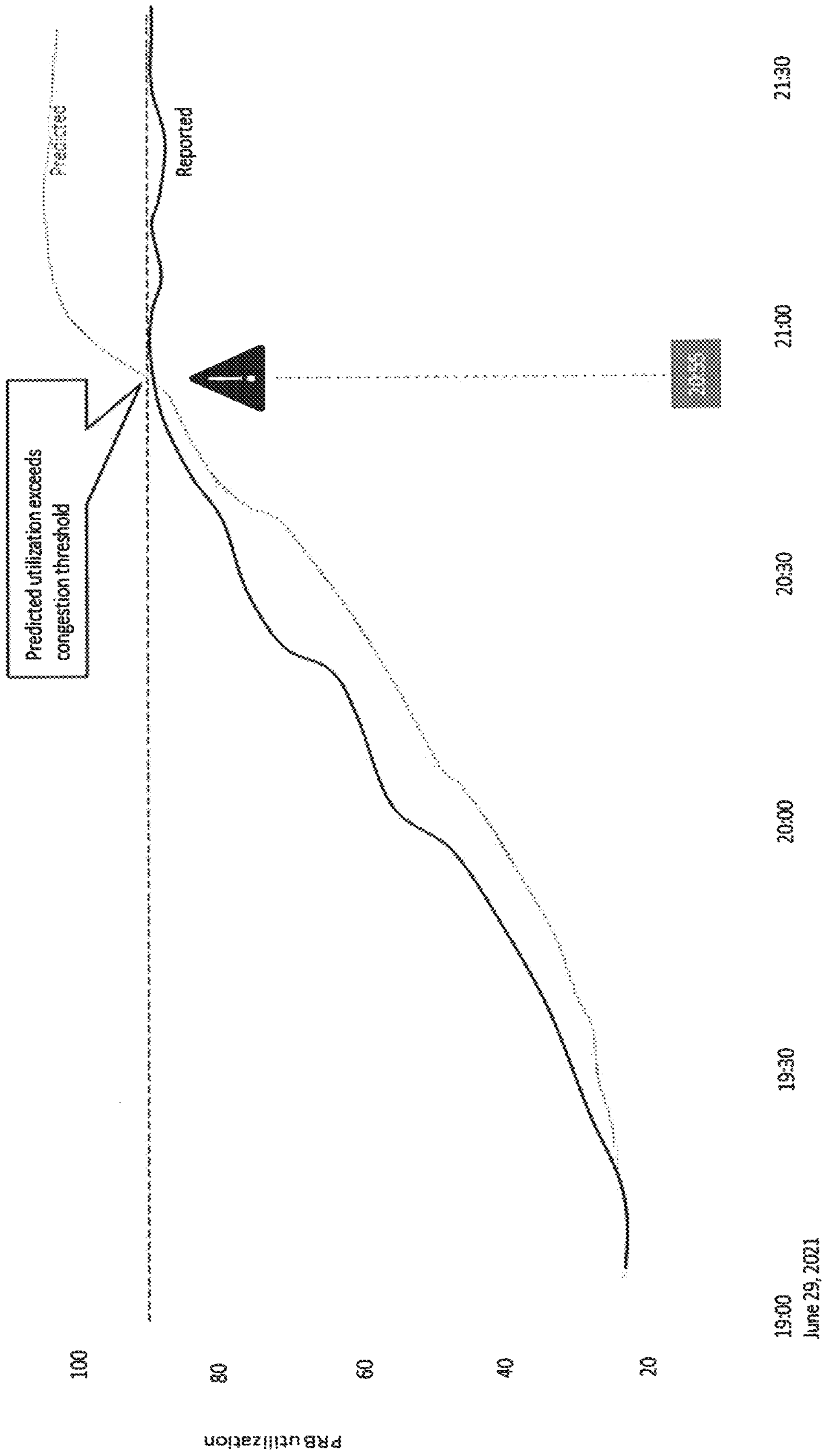
FIG. 6 is a congestion diagram illustrating a congestion mitigation scenario.

FIG. 6 illustrates a predication (i.e., a temporal extrapolation) of the load of an individual cell based on PRB utilization (as gathered in the RAN domain for that cell). PBR utilization thus serves as an exemplary congestion indicator. The prediction may be based on an observed trend of PRB utilization and, possibly, its dynamics (e.g., using an ML algorithm). The time frame of the prediction (e.g., of 1 hour or longer) may be chosen to overcome the delay of closed-loop congestion mitigation actions. That is, the prediction shows the expected behavior of PRB utilization without any congestion mitigation actions being taken.

In the scenario of FIG. 6, a threshold decision is applied to the predicted PRB utilization to check if a potential candidate cell is prone to suffer from congestion. As illustrated in FIG. 6, the PRB utilization threshold may be set to 90%, and the prediction may yield that PRB utilization will exceed that congestion threshold at 20:55. Responsive to detecting the predicted congestion event, the cell under consideration is identified as a candidate cell prone to suffering from congestion, and the method proceeds to step 520 for that candidate cell. Therefore, even before the candidate cell enters an actually congested state, measures can be taken to mitigate congestion for that cell in an effort to avoid drastic user experience degradation.

Step 520 of FIG. 5 comprises correlating, for at least one of the one or more candidate cells identified in step 510, session-related information from the core network domain with RAN information from the RAN domain. The correlation step 520 targets at deriving at least one quality indicator for the at least one candidate cell.

The RAN information may comprise at least one of RAN node statistics and RAN counter information. As an example, the RAN information may relate to at least one of PRB utilization (as, e.g., also evaluated in step 510), throughput, number of users, cell trace (CTR) events, and radio resource control-(RRC-) related information (e.g., number of RRC users).

The session-related information from the core network domain may relate to individual end-to-end communication sessions. As an example, the session-related information may be indicative of a particular service or a particular subscriber underlying a particular session. The session-related information may relate to events on at least one of a control plane and a user plane of the core network domain, including the NG-Core 170 and the IMS 220 in the scenario of FIGS. 2 and 3. For example, different types of session-related information may be gathered from the IMS 220 for a voice service (e.g., VoLTE). Corresponding user plane information includes packet loss on RTP ("Real Time Protocol"), delay, jitter, sequence jumps. Corresponding IMS control plane information includes session ID, session codec type, International Mobile Subscriber Identity (IMSI), International Mobile Equipment Identity (IMEI) as well as session setup, change, and termination KPIs.

The at least one quality indicator derived in step 520 may be a KPI. The at least one quality indicator may be indicative of at least one of a Quality of Service, QoS, and a Quality of Experience, QoE. As an example, the at least one quality indicator may be a mean opinion score (MOS). As another example, the at least one quality indicator may be indicative of RAN counter information per service and/or per subscriber group.

Correlating the session-related information with the RAN information in step 520 may comprise associating session-related information gathered in the core network domain for the particular session with RAN information gathered in the RAN domain for or during the particular session. As such, one data record with correlated information may be generated for each session. In some variants, an individual session may be divided into smaller temporal units, and a separate correlation may be performed per temporal unit (resulting in multiple data records with correlated information per session). One or more sessions may comprise multiple flows. In such a case, the session-related information may be correlated on a per-flow basis. As such, one data record may be generated per flow. Like an individual session, also an individual flow may be divided into smaller temporal units, and a separate correlation may be performed per temporal unit (resulting in multiple data records with correlated information per flow).

The correlation step 520 may at least substantially be performed in real-time. For example, data record generation may be performed continuously as the session-related information and the RAN information becomes available to the correlation apparatus 200.

The session-related information is in some implementations gathered in the core network domain and correlated by the correlation apparatus 200 for more than 50% (e.g., more than 80% or 100%) of all sessions in the candidate cell. This approach will generate a significant amount of information that needs to be monitored, gathered, stored, processed, and so on. To keep the associated processing and storing requirements low, the monitoring and gathering of the session-related information may be conditionally triggered in the core network domain, and for a given candidate cell, responsive to determining in step 510 that the candidate cell is prone to suffering from congestion. As such, gathering in the core network domain of the session-related information for the candidate cell is only started if the congestion is actually expected to occur. Therefore, no session-related information needs to be gathered (and correlated) for any cell that has not been identified as candidate cell in step 510. Such "spotlight" analytics (i.e., analytics focused on the candidate cells) keeps the footprint in the core network domain low, for example in terms of processing and storage resources.

In the scenario of FIGS. 2 and 3, step 520 may comprise receiving the RAN information via a first interface (e.g., the A1 interface) of the SMO framework 110. In the scenario of FIG. 3, at least the correlation step (or more method steps, such as all method steps) is performed by the SMO framework 110. Step 520 may comprise receiving the session-related information via a second interface of the SMO framework from the core network domain (here: the NG-Core 170 and/or the IMS 220). In the scenario of FIG. 2 least the correlation step (or more method steps, such as all method steps) is performed by the AI server 210 external to the SMO framework 110. Step 520 may thus comprise forwarding the RAN information, via a third interface of the SMO framework 110, to the AI server 210 and receiving, by the AI server, the session-related information from the core network domain (here: the NG-Core 170 and/or the IMS 220) via a fourth interface of the AI server 210.

With reference to the exemplary scenario of FIG. 6, the correlation in step 520 may correlate the number users (i.e., RAN information) with the service being used (i.e., session-related information from the core network domain). The quality indicator may thus be the number of users per each of different services. Evaluation of the quality indicator (in a subsequent step 530) may thus yield that the number of users of a specific service is drastically increasing, giving rise to the increase in PRB utilization. Other services may not see such an increase of users.

Once the at least one quality indicator has been derived in step 520, the method illustrated in FIG. 5 proceeds to step 530 of triggering, dependent on the at least one quality indicator derived for the at least candidate cell, one or more congestion mitigation actions. As an example, the at least one congestion mitigation action may be triggered responsive to determining that the at least one quality indicator fulfills a (e.g., threshold-based) degradation condition. The triggering step 530 may be performed automatically, semi-automatically (e.g., involving a human confirmation) or manually.

In step 530, at least a first of the one or more congestion mitigation actions may be triggered to be performed in the core network domain (here: in the NG-Core 170 and/or the IMS 220). If the communication network is configured to transport service traffic for different services, the first of the congestion mitigation actions may comprise service traffic shaping. Service traffic shaping may include prioritzing the service traffic of one service over the service traffic of another service. With reference to the exemplary scenario of FIG. 6, traffic shaping may result in the more heavily utilized service receiving less bandwidth. In this manner, the actual (i.e., reported or measured) PRB utilization in the RAN domain can be kept below 90%, as illustrated in FIG. 6. It can thus be avoided that all users in the candidate cell experience congestion.

The at least one congestion mitigation action may be triggered in step 530 when the at least one quality indicator derived for the at least candidate cell fulfills at least one degradation criterion. In case service traffic for a first service and for a second service are transported in the communication network, the at least one quality indicator may be derived separately for the first service and for the second service. There may then exist different degradation criteria for the first service and the second service.

If the communication network is configured to transport service traffic for a first service and for a second service, a second of the one or more congestion mitigation actions may triggered for the first service and may not be triggered for the second service. In such a scenario, a third of the one or more congestion mitigation actions may be triggered for the second service and may not be triggered for the first service, or no congestion mitigation action may be triggered for the second service. The second and third congestion mitigation actions are different, but may be similar to the first congestion mitigation action.

At least a fourth of the one or more congestion mitigation actions may be triggered to be performed in the RAN domain. If the RAN domain is configured to transport service traffic for a first service on a first radio bearer (or radio channel) and to transport service traffic for a second service on a second radio bearer (or radio channel), the fourth of the one or more congestion mitigation actions may be triggered for the first radio bearer (or radio channel) and not triggered for the second radio bearer (or radio channel). A fifth of the one or more congestion mitigation actions may be triggered for the second radio bearer (or radio channel) and may not be triggered for the first radio bearer (or radio channel). Alternatively, no congestion mitigation action may be triggered for the second radio bearer or channel. The fourth and fifth congestion mitigation actions are different, but may be similar to the first, second or third congestion mitigation action.

The communication network may be configured to provide communication services on a subscription basis to a first subscriber set and to a second subscriber set. In such a case, a sixth of the one or more congestion mitigation actions may be triggered for the first subscriber set (e.g., VIP subscribers) and may not be triggered for the second subscriber set (e.g., non-VIP subscribers). Moreover, a seventh of the one or more congestion mitigation actions may be triggered for the second subscriber set and may not be triggered for the first subscriber set. Alternatively, no congestion mitigation action may be triggered for the second subscriber set. At least one of the sixth and the seventh congestion mitigation action may be triggered to be performed in the core network domain. The sixth and seventh congestion mitigation actions are different, but may be similar to any of the first to fifth congestion mitigation actions.

Step 520 may comprise correlating the session-related information with subscription information (e.g., from a subscriber database in the core network domain) to derive the at least one quality indicator separately for the first subscriber set and the second subscriber set. If, in step 530, the at least one congestion mitigation action is triggered when the at least one quality indicator derived for the at least candidate cell fulfills at least one degradation criterion, there may exist different degradation criteria for the first subscriber set and the second subscriber set.

The method may further comprise performing a root cause analysis for each of the one or more candidate cells (e.g., in one or both of steps 510 and 520). In this case, step 530 may comprise selecting, based on a result of the root cause analysis, at least one of the one or more congestion mitigation actions to be triggered.

The method may comprise a closed-loop procedure in which step 530 loops back to step 520 (see dashed arrow in FIG. 5). As such, after at least one of the one or more congestion mitigation actions has been triggered, fresh session-related information may be correlated in step 520 with fresh RAN information to derive at least one fresh quality indicator. Moreover, based on the at least one fresh quality indicator, it may be determined in step 530 if the at least one congestion mitigation action needs to be modified (e.g., relaxed, increased, or terminated), and a corresponding modification may be then be triggered.

Figure 7:
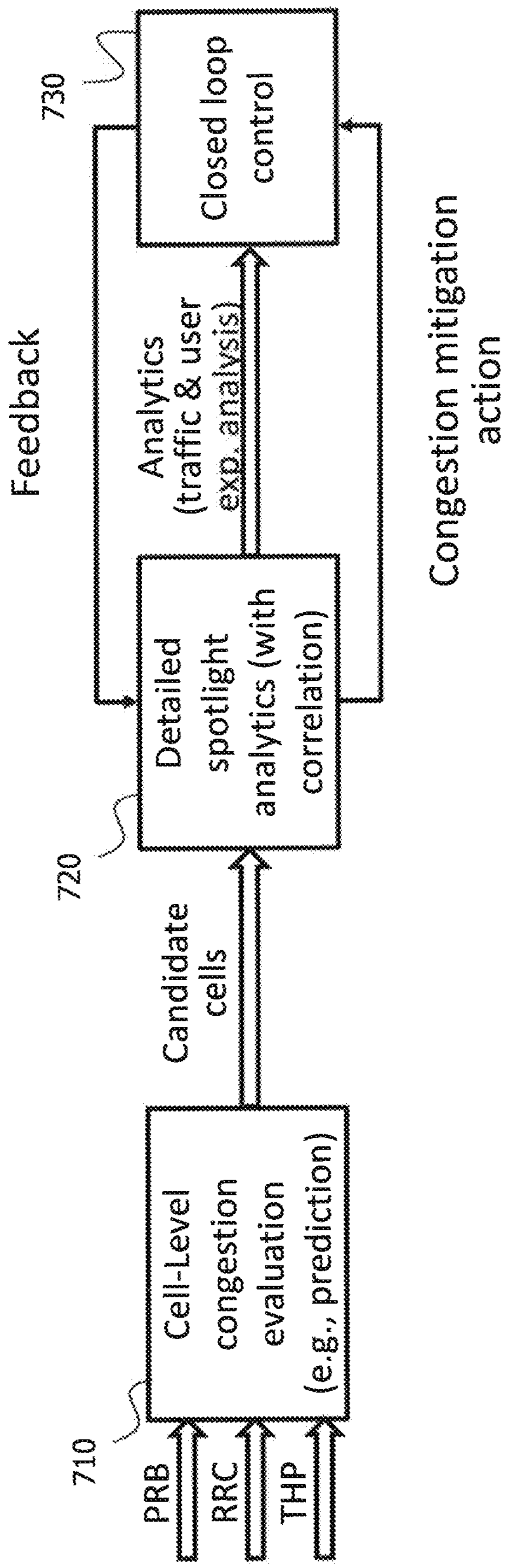
FIGS. 7 & 8 are block diagrams illustrating closed-loop realizations of the present disclosure.

FIG. 7 illustrates a block diagram of a closed-loop congestion evaluation and mitigation procedure. In block 710, congestion evaluation takes place (e.g., in accordance with step 510 of FIG. 5). The congestion evaluation in block 710 may take the form of a prediction and may solely use RAN information as input, such as Ran counter-based information in terms of PRB usage, RRC user numbers and throughput (THP).

Once one or more candidate cells have been identified in block 710, a correlation takes place in block 720 of FIG. 7 (e.g., as explained above in the context of step 520). The correlation in block 710 includes spotlight analytics per candidate cell to derive the at least one quality indicator. The spotlight analytics may specifically yield dedicated quality indicators per service and possibly in terms of user experience metrics (e.g., in terms of a QoE KPI).

Dependent on an analytics result in regard to the one or more quality indicators (e.g., depending on a thresholding based one or more degradation criteria), a congestion mitigation action is triggered in block 730 (e.g., as explained above with reference to step 530). Any mitigation effect of the congestion mitigation action may then continuously be evaluated by correlating, in block 720, "fresh" information gathered after the congestion mitigation action has been triggered, possibly followed by a feedback towards block 730 so that the congestion mitigation action can be modified as needed.

Figure 8:
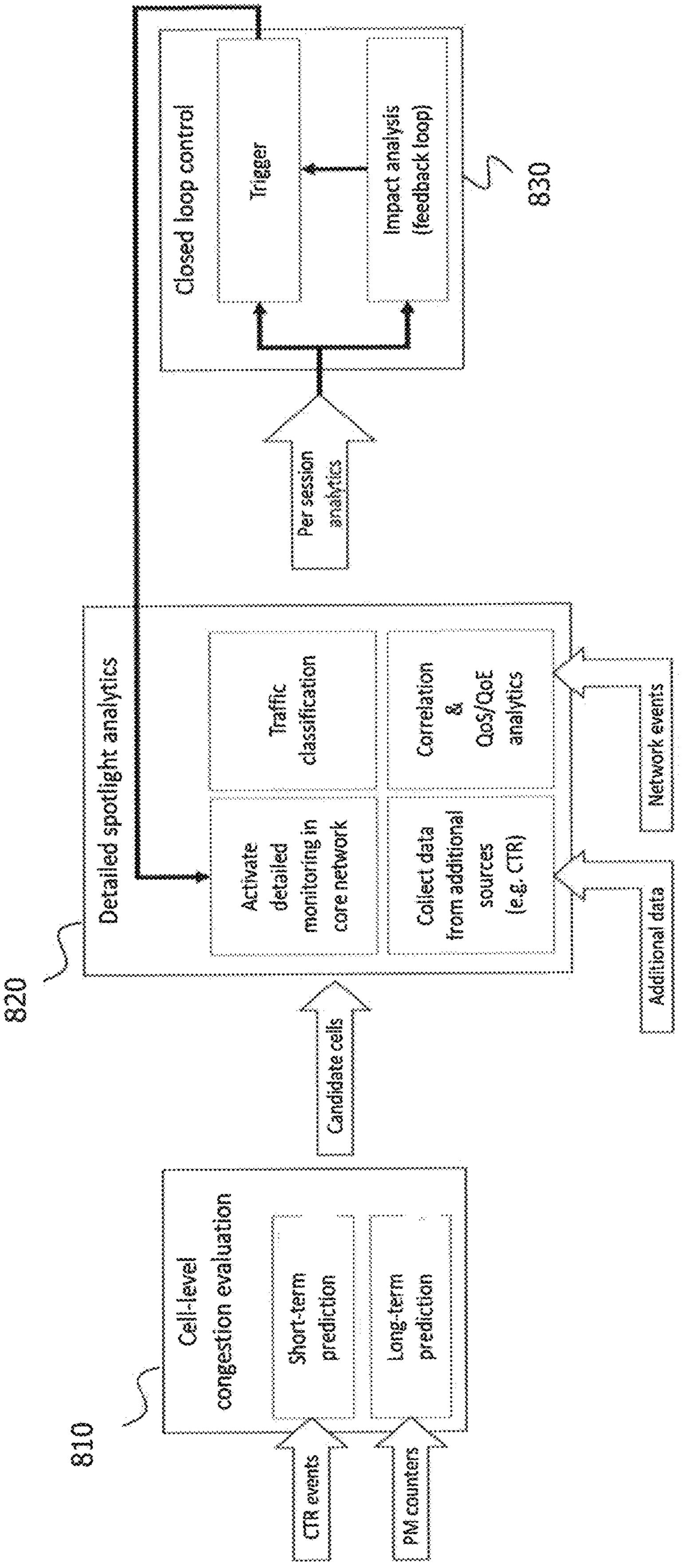

FIG. 8 illustrates a detailed variant of the closed-loop procedure of FIG. 7. In block 810, similar to block 710, congestion evaluation takes place (e.g., in accordance with step 510 of FIG. 5). The congestion evaluation comprises a short-term prediction and in parallel a long-term prediction. As an example, performance management (PM) counter information from the RAN domain may be gathered and analyzed on a basis of, for example, 15 minutes for the long-term prediction and CTR events may be gathered and analyzed on, for example, a 1 minute basis for short-term prediction. This input may then be used to train ML prediction models that identify candidate cells prone to suffering from congestion in the short term (e.g., one minute to one hour) or in the long term (e.g., one hour to days, weeks or months). For the candidate cells (and optionally the root cause(s) for congestion) as identified in block 810, spotlight analytics is then performed in block 820.

Short-term congestion prediction and long-term congestion prediction in block 810 require different models and variables. For example, a time-dependent multivariable prediction model may be used to forecast the dynamic nature of the network behavior. In this regard, a classifier may be applied to detect a possible congestion event in the network for a long-term congestion (LTC) model. The usage of a classifier permits to identify possible congestion events (also called incidents) in the network. Any time-dependent multivariable prediction model, forecasting the network behavior or traffic, results in the next value in a time series including the previous 'n' values. As a consequence, the analytics does not identify the congestion as such. Rather, one has to define one or more rules that create congestion events. If one takes a step ahead, one could train a weakly-supervised model on a few different rules and create a congestion classifier model that is capable of finding out possible congestion events. Such a model will help not just identifying the congested time frames after creation, but also identifying (based on the traffic forecasts) the possible congestion events that might trigger traffic congestion mitigation actions (e.g., a capacity extension by network planning engineers).

Moreover, a simplified model for short-term congestion (STC) with a different internal structure can be implemented. Due to the nature of STC, the STC prediction model does not need to learn complex seasonal dependencies, auto-correlation patterns and impacts on neighboring cells in the time series. The STC prediction model only needs to give a reliable forecast a few minutes ahead, for rare events. The classification part may change to a probabilistic model that calculates a congestion probability (e.g., for the given second) with respect to the expected changes in conditions (e.g., for the next few minutes).

The LTC and STC prediction models differ in the input parameters: the LTC prediction model requires PM data (e.g., RAN counter information) with a lower granularity, while the STC prediction model requires cell trace record (CTR) events as input with a high resolution (see input to block 810 of FIG. 8). Both models may take cell adjacency as an input, that either finds from configuration management (CM) data the neighbor cells for all the cells in the network, or derived from handover statistics of the CTR. In contrast to PM data, that are measured by the network, CM data are external parameters such as core and radio network settings.

Each model may apply a hybrid of statistical approaches and machine learning to forecast the future PRB utilization or any other congestion indicators. Classification modules may be defined for both the LTC and the STC prediction model, that differ in the calculation algorithm: the STC prediction model may apply a Bayesian probabilistic model to estimate how probable a congestion is in the near future, whereas the LTC prediction model may apply a classification-based solution that identifies congested time windows.

Long-Term Congestion Prediction Model

The LTC prediction model may build on top of a data aggregation module that provides the required RAN information from the communication network for each network node of interest (e.g., each cell in the RAN domain).

A prediction module of the LTC prediction model may take as an input the list of neighboring cells. The prediction model may de-levels and/or de-season a time series of a given congestion indicator (such as PRB usage) to remove regular fluctuations (e.g., day/night usage patters, weekday/weekend usage patterns, etc.). It then predicts the remainder of the time series, applying cross-learning in-between neighboring time series. Decomposing time series in such case may be important due to the fact that most of the current ML models do not handle seasonality well: due to the inherent generalization of ML models, for seasonal time series of a congestion indicator they tend to give predictions around the average of the periods.

After the "de-seasonalization" step, normalization may be applied. Normalization may either occur across the whole time series, or by sliding input and output windows, and get the time series values within both windows divided by some reasonably stable value that changes with the series, e.g., the median of last seasonality-number of points.

After the "de-seasonalization" and possibly normalization, AI (e.g., neural networks) can be used to forecast the congestion indicator in a very long range. However, AI may not have a notion of a time axis. Therefore, the time series are preprocessed (normalization and de-seasonalization) before training and executing prediction. Learning across multiple time series (e.g., also of neighboring cells) solves the issue of learning hundreds of parameters and gives the possibility of cross-learning. A time horizon of the solution may be configurable due to possible network structures (that can, for example, be stored as a metadata). The prediction module outputs forecasts for the given input time series of the congestion indicator on the desired time horizon.

A congestion identifier module of the LTC prediction model takes as an input the forecasted time series for the given horizon(s) of the prediction module. After the long-term horizon prediction, the LTC prediction model triggers the identifier module, that isolates potential congestions in the future time horizon. This module is either trained with historical congestion data, creating a classification problem, or uses a "rules of thumb"-based congestion threshold (e.g., applies such threshold on PRB utilization and/or number of users). The module outputs identified congestion time frames of the communication network for given time series and individual cells.

A root cause detection (RCD) module of the LTC prediction model takes the identified congestion time frames as an input and also takes the traffic classification data from the data source for a longer period in higher granularity (e.g., hours, days, weeks). Taking into account the given congestion event(s) and the traffic classification data, the RCD module returns the most probable source of the congestion problem. This may be done by an aggregation technique based on the occurrences of the congestion event(s), for example using different combinations of aggregation schemes that will help to identify the problem. These schemes can contain information such as:

- Service usage patterns for congested and non-congested time periods
- Number of subscriber patterns for congested and non-congested time periods.
- Number of request patterns for given services for congested and non-congested time periods
- Average usage
- Neighboring and non-neighboring cell average usages for given services The RCD module takes these predefined aggregations and gives the probabilities for the possible root causes. It may also mark the most probable root cause.

Short-Term Congestion Prediction Model

The STC prediction model may build on top of a data aggregation module that provides the required RAN information from the communication network (e.g., for individual cells).

In the case of STC prediction, a problem typically occurs locally and does not spread among the neighboring network cells (as in a "network of pipes" model). So, there is no need to focus the prediction on neighboring dependencies, just on inferences that can be taken from an auto-correlated time series of RAN information such as PRB utilization, RRC users, and so on. This type of congestion prediction can be run over individual cells in a spotlight analytics fashion, keeping a dynamic list of highly loaded cells for deeper investigation to keep hardware requirements low.

The STC prediction model includes a prediction module. STC relates to congestion problems that occur locally as relatively rare events, such as traffic jams due to accidents or sport events. Such congestion problems lead to unbalanced data, or even to data that do not contain any information on the desired target problem. Therefore, cross-learning from multiple time series is very fuzzy, since the core problem does not have a relatively good representation in the data. Stratified sampling will lead to a stateful model, that will imply maintenance and will need frequent monitoring for distribution changes. The model may also need frequent retraining due to short time windows and a fast-changing volatile environment, so it has to be fast.

To overcome these challenges, probabilistic models can be applied, such as Generalized Additive Models, which is the summation or product of the outputs of different models. STC prediction may be based on predefined priors on the parameters of terms and then use a Markov Chain Monte Carlo sampling approach to find a posterior distribution and the maximum aposterior estimate (MAP) of the observed time series. One may select such prior distribution (e.g., Normal or Laplacian) easily by "rules of thumb", as it will adapt to the true underlying distribution as time passes.

Learning with changing distributions in a very short period, i.e., a few minutes ahead, is feasible, and such models can be calibrated with even a large parameter grid in less than a minute. This approach allows to create a frequently relearning model, that contains all the information of the past data at the time horizon of the prediction. The model may take as an input one or more time series and predict the trend, a level shift and an error part of it.

A congestion identifier module of the STC prediction model receives the output of the prediction module, and by taking into account the probability of congestion in the next few time frames ahead, it calculates the probability of a trespassing given congestion threshold. Thresholds may either be set by "rules of thumb", or by calculating the first derivative of the predicted time series. The module will return the probabilities of congestion for the different cells in the next time window.

An RCD module of the STC prediction model takes the previous time frames of identified congestion time frames as an input and may also consider traffic classification data from the data source aggregated on short time periods, e.g., 30 seconds, 1 minute, and so on. Based on the given congestion event(s) and the traffic classification data, the RCD module returns the most probable source(s) of the congestion event(s), possibly weighted with the probability of congestion in the next time frames. This may be done by aggregation techniques based on the occurrences of the congestion event. Using different combinations of aggregation schemes will help to identify the problem. These schemes can contain information such as:

- Service usage patterns for the given cell
- Number of subscriber patterns for the given cell
- Number of request patterns for a given service for the given cell
- Average usage for the given cell The RCD module takes these predefined aggregations and the previous time frames before the congested time frames as input and outputs the probabilities for the possible root causes. The RCD module may mark the most probable root cause.

As shown in FIG. 8, block 810 yields (either individually or in a batch) a set of candidate cells prone to suffering from congestion as input for a subsequent block 820. Block 810 may also yield associated metadata (e.g., regarding possible root causes). The candidate cells will then form the basis of a detailed spotlight analytics in block 820 (e.g., similar to block 720 of FIG. 7 and as described in the context of step 520 of FIG. 5).

The spotlight analytics in block 820 starts with activation of detailed session-based monitoring (and information gathering, for example in terms of network events) in the core network domain for each candidate cell. The monitoring may be performed on one or both of a control plane and a user plane of the core network domain.

As part of the monitoring, service traffic on the user plane may be classified on a per-session basis regarding the associated service underlying a particular session. Additionally, or in the alternative, the classification may relate to a particular subscriber group (e.g., to differentiate VIP subscribers from non-VIP subscribers). The information thus gathered in the core network domain will then be correlated per session with associated information from additional data sources, including RAN information (such as CTR events or number of users). The additional data sources may also comprise a subscriber database to determine the subscriber group (e.g., VIP vs. non-VIP subscriber) associated with a particular session and a database with cell reference information. The correlated information (e.g., in the form of individual data records for further analysis), possibly enriched with subscriber and cell reference information, is then analyzed in terms of at least one QoS- or QoE-related quality indicator (e.g., a video MOS for different video-related services). In this regard, one or more thresholding decisions may be applied.

Dependent on the result of the analysis in block 820, one or more congestion mitigation actions are triggered in a subsequent block 830. In a closed-control loop, the impact of these actions may be evaluated and the actions may be modified as needed. As part of the feedback mechanism, the actions may impact the core network domain monitoring in block 820 and the associated correlation steps.

In the following, exemplary usage scenarios of the technique presented herein will be discussed. Those scenarios may be performed in the context of any of the implementations discussed above with reference to FIGS. 2 to 8. Evidently, a wide variety of other or similar scenarios could be implemented.

Scenario 1: Slowly Developing Congestion Due to Population Increase (LTC)

Figure 9A:
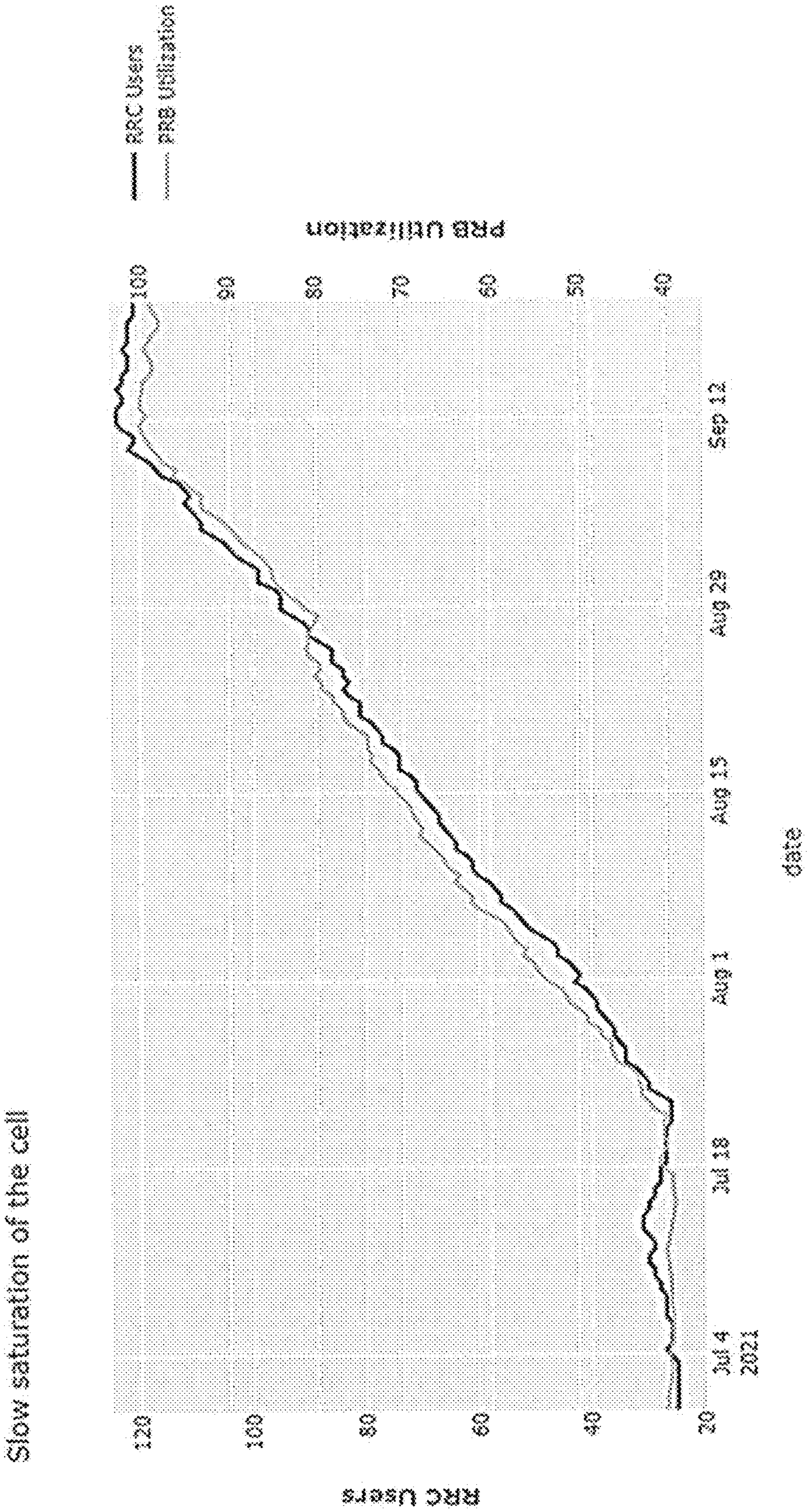
FIGS. 9-12 are diagrams illustrating different congestion mitigation scenarios in accordance with the present disclosure.

In this scenario, a slowly increasing trend is observed in the overall cell load (in terms of PRB utilization) and the number of RRC users, as illustrated in FIG. 9A. FIG. 9A illustrates a prediction of a temporal behavior of those congestion indicators for an individual cell (that may become a candidate cell as a result of a thresholding decision). The prediction illustrated in FIG. 9A is based on RAN information derived only from PM counters in the RAN domain.

Figure 9B:
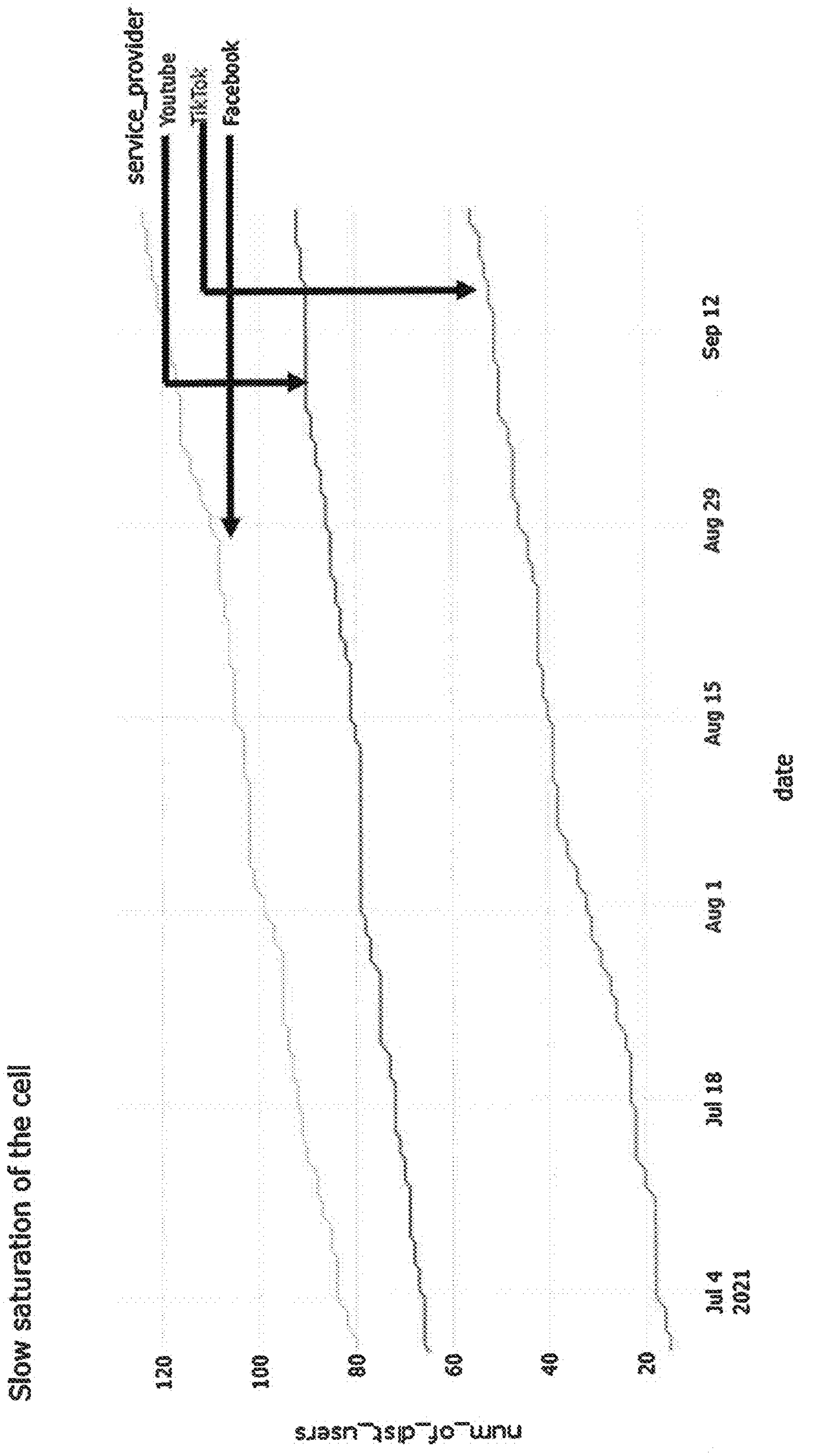

After a correlation of session-based information from the core network domain and RAN information for the candidate cell, a deeper, per-service traffic analysis for individual sessions shows that the trends are not specific for any given service, since popularity and user base, as exemplary quality indicators, is growing for all service providers (see FIG. 9B for three exemplary services). Even though there may be slight differences in the pace of traffic growth (in aggregated terabytes data traffic in the downlink, as a further quality indicator), the growing trend impacts all types of network traffic (see FIG. 9C), and no significant changes in the average network user profile are observed (see FIG. 9D indicative of average terabytes data traffic per user, as a still further quality indicator).

Figure 9C:
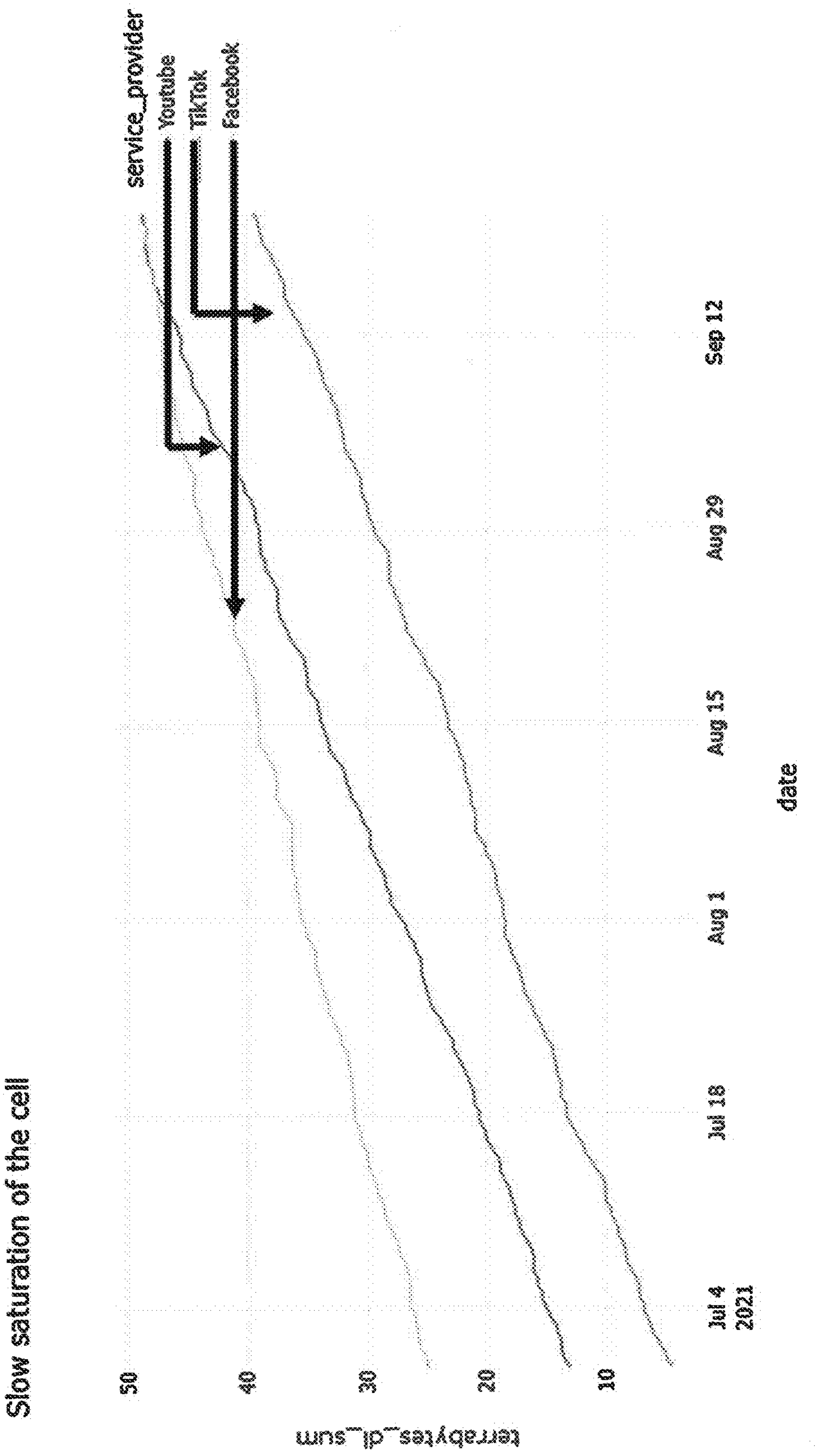
Figure 9D:
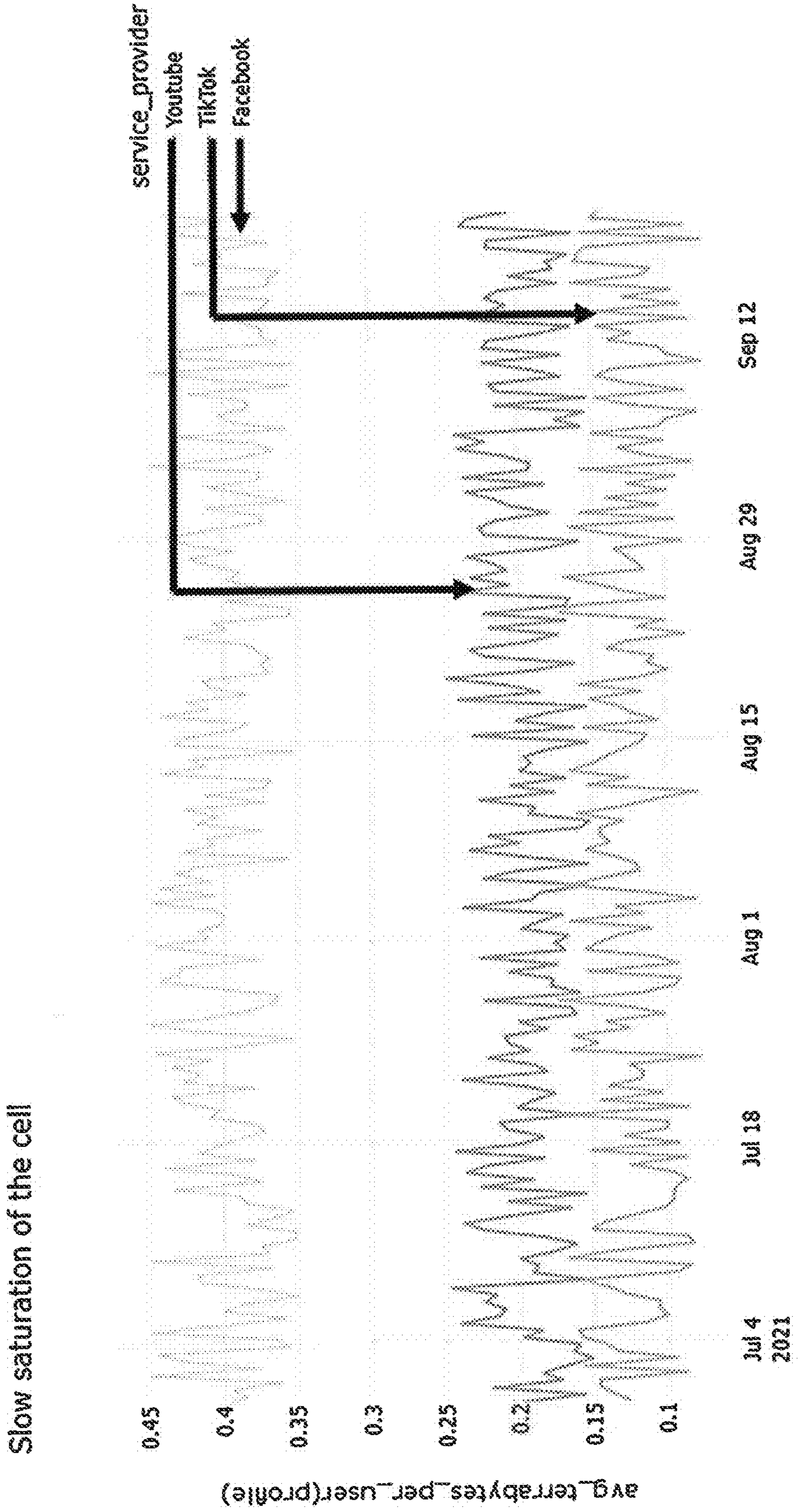

The slowly increasing KPI trends in FIGS. 9B to 9D indicate that the analyzed cell will be getting into a congested state more and more often in the foreseeable future. Population increase is identified as the root cause for the congestion that calls for a network capacity expansion or upgrade as a suitable congestion mitigation action. The importance of a capacity expansion in the analyzed area could be evaluated in terms of an expected loss in user experience, i.e., in terms of the impact of congestion.

In a first step, this can be done by identifying time frames when congestion is observed, and comparing observed QoS/QoE information to corresponding information from "normal" (i.e., non-congested) time frames. Then the prediction tells the expected frequency of congested time periods in the future, and the comparison and prediction together indicate the user experience impact if no extra capacity is provided.

Scenario 2: New Viral Service (LTC)

The next scenario from a PRB utilization perspective is not differentiable from the one illustrated in FIG. 9A. In this scenario, there is a new, data-intensive viral service provider with a rapidly increasing user base (a recent example was the Tik-Tok video service).

Figure 10A:
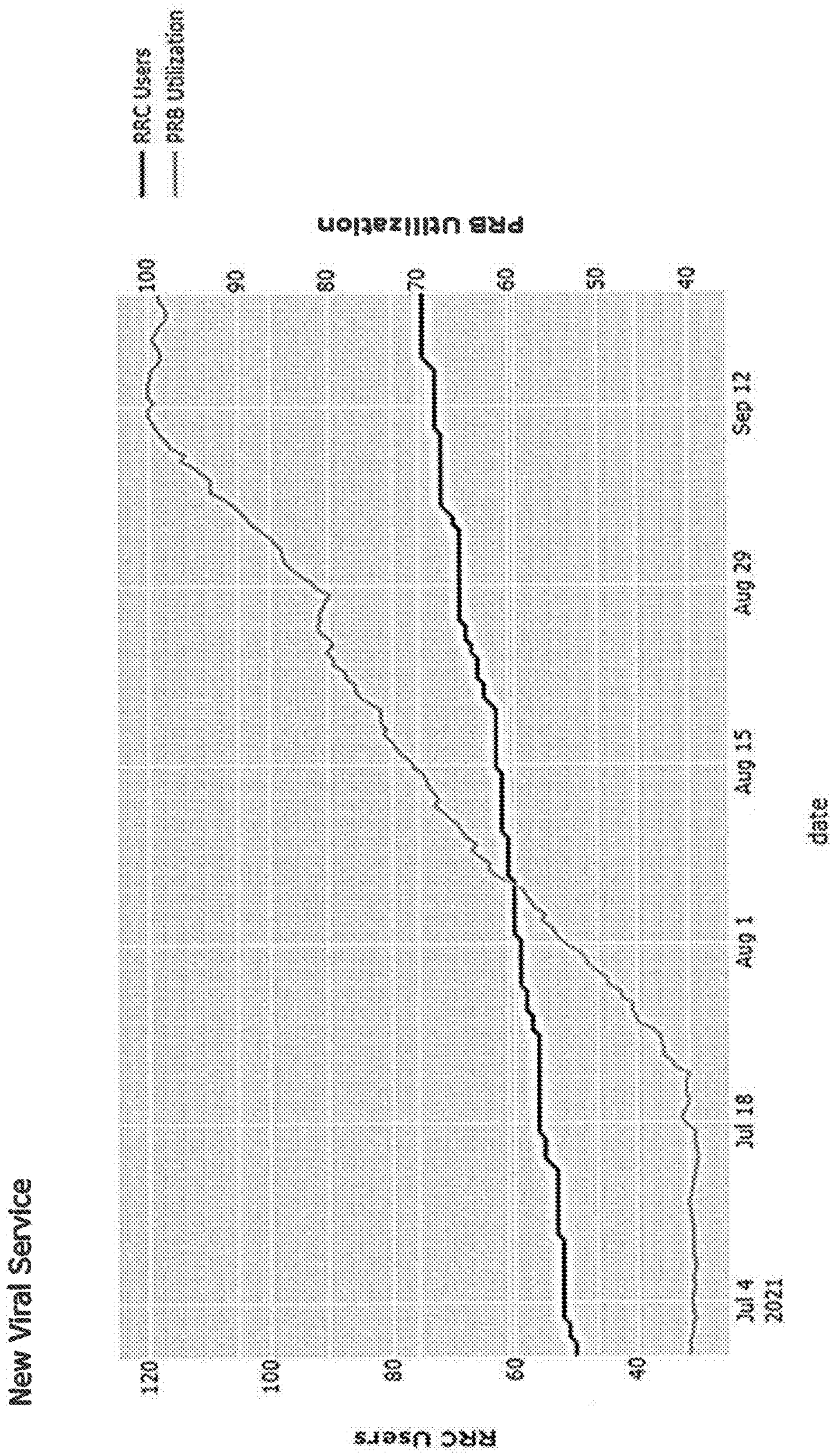
Figure 10B:
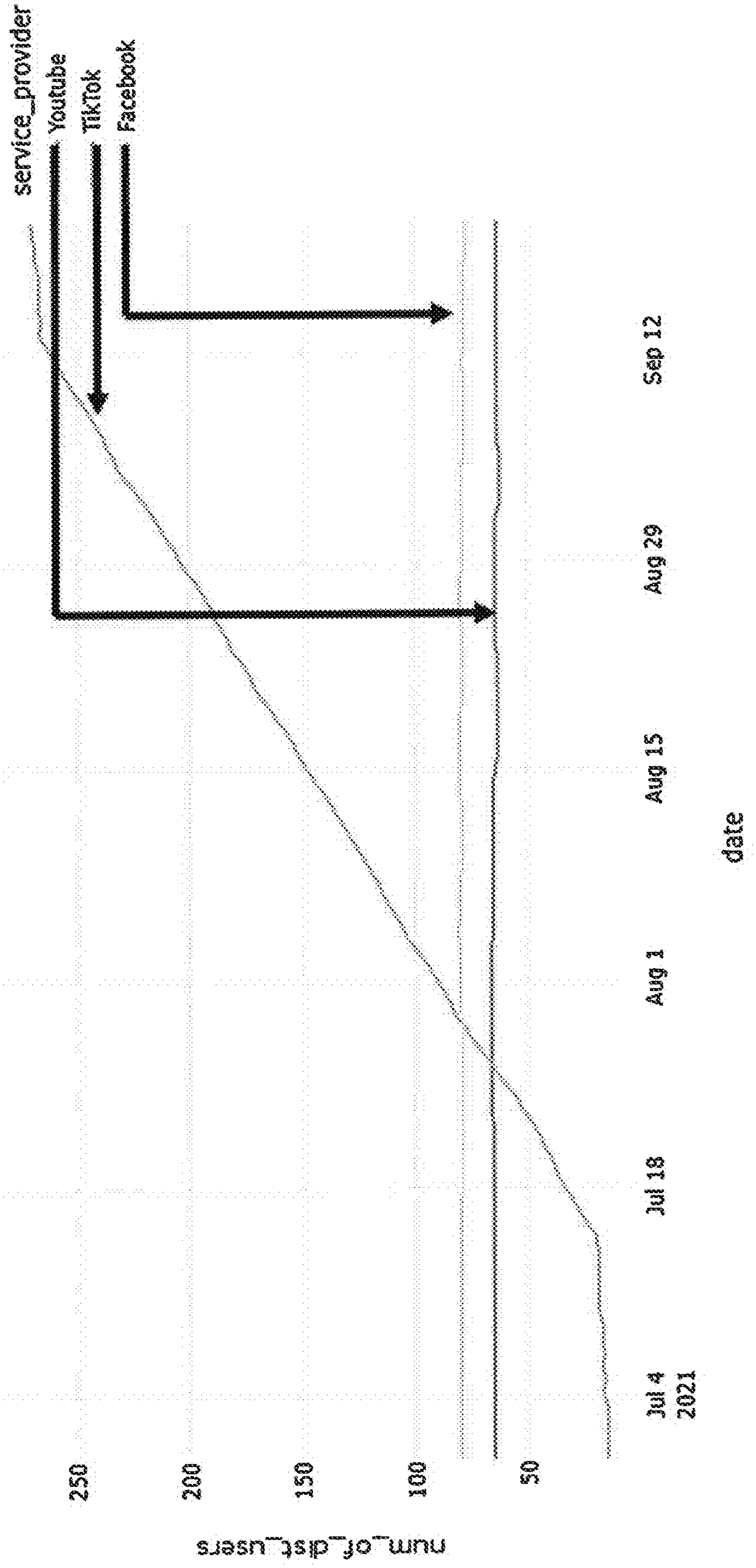
Figure 10C:
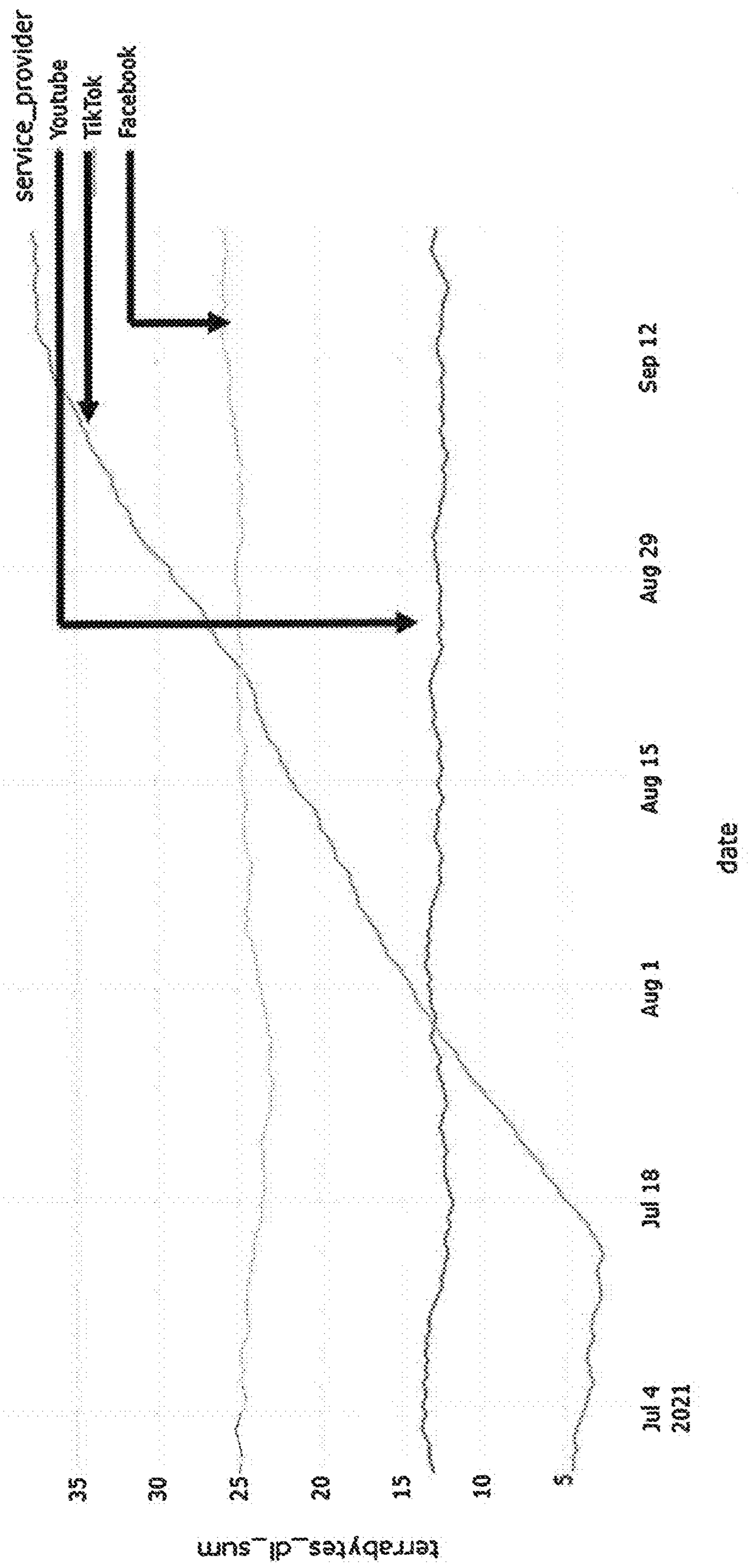

PRB utilization shows a solid, sustained growth trend all cells (see FIG. 10A for a particular cell). However, the underlying traffic mix is different: the total number of users does not keep up with this trend (see FIG. 10A), while the number of users per service provider reveals the driving force (see FIG. 10B): it is not a uniform growth. Most of the service providers show no significant change, while the service traffic of the new, viral service provider grows significantly (see FIG. 10C).

This situation leads to user experience degradation for all users and all services on the long run, unless either the network capacity is increased (e.g., by deploying further hardware as a congestion mitigation action), or other services are protected from the viral newcomer by adaptively updating priorities to different services to maintain the desired QoS/QoE for the higher priority services (e.g., by service traffic shaping as another congestion mitigation action). Since the success of such viral service providers might be temporary only, avoiding or at least delaying further hardware in such cases is preferred.

Scenario 3: Sports Event With Shared Content and Video Streaming (STC)

Figure 11A:
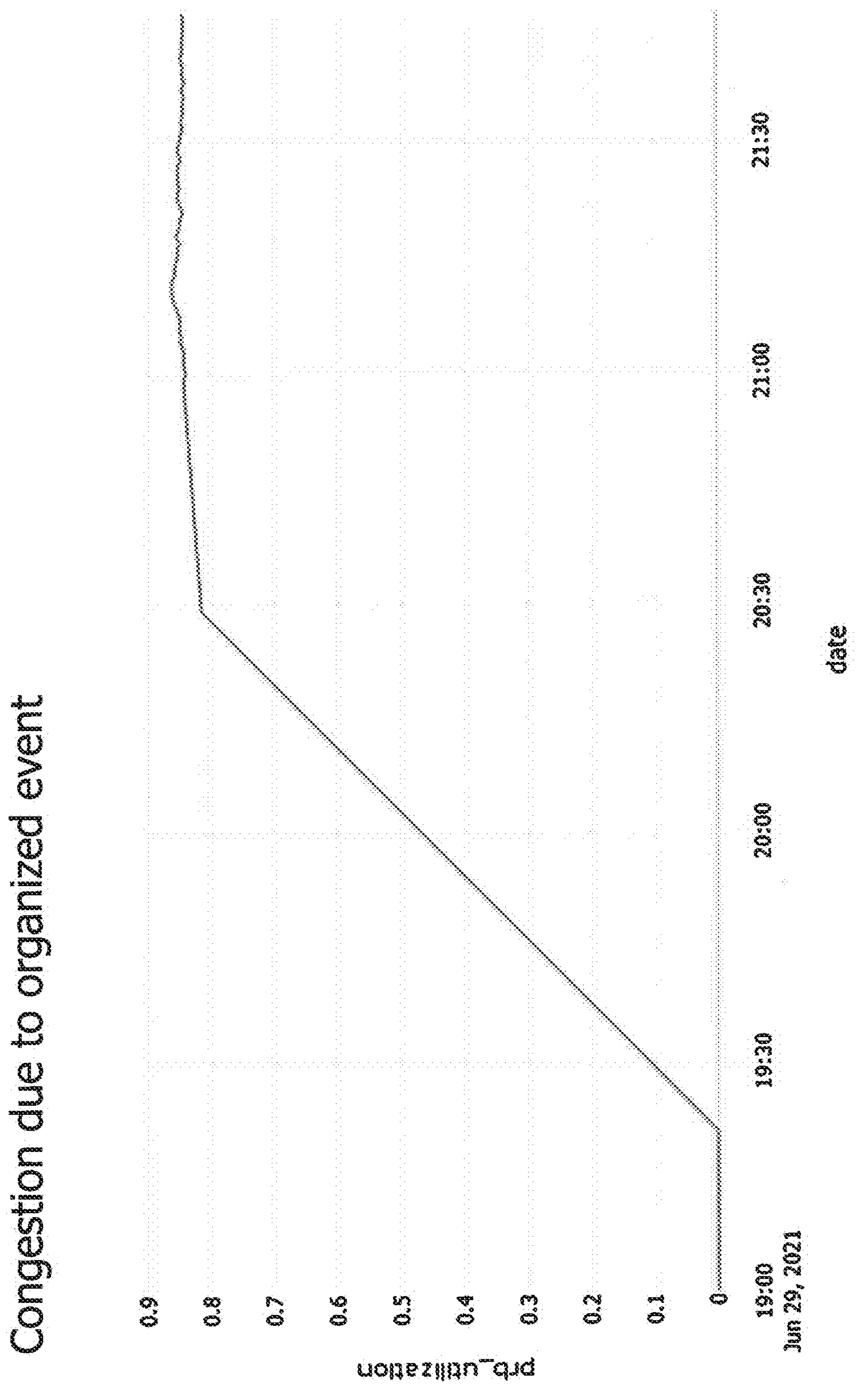
Figure 11B:
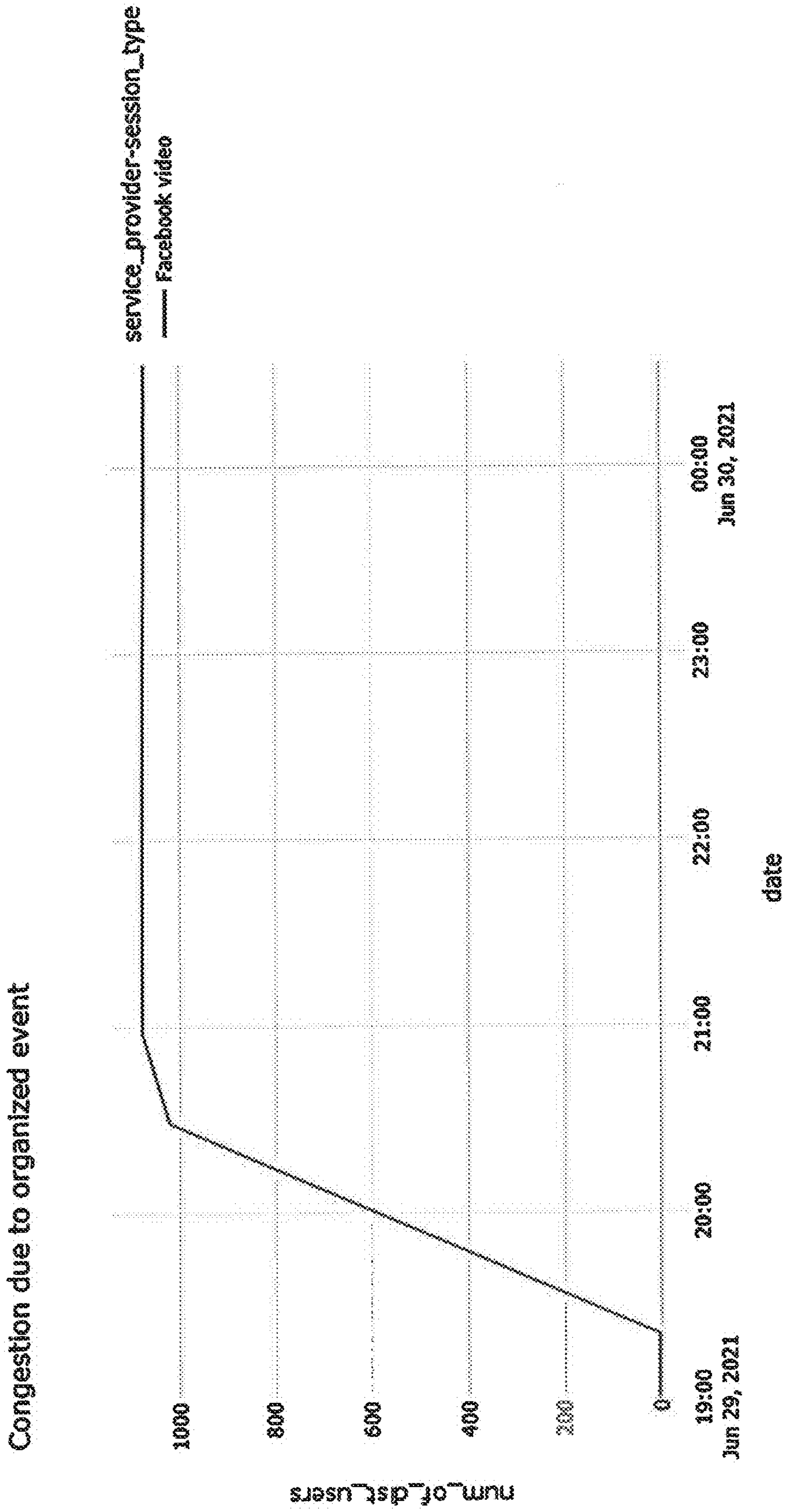
Figure 11C:
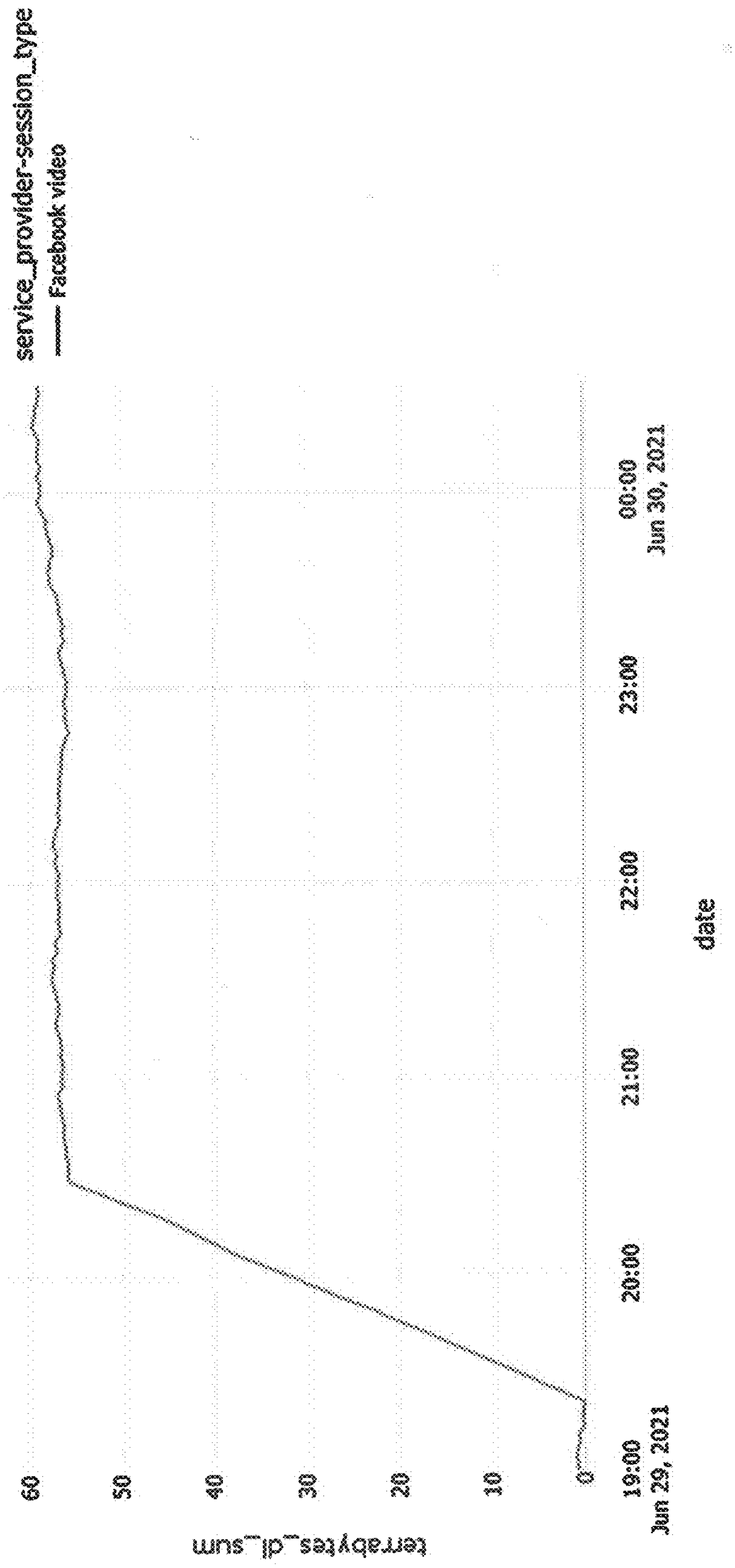

In this scenario, an organized sports event brings in a high volume of spectators in a certain cell or cell set. Within the crowd, a number of users are actively using the RAN domain to share content or even to send video streams (e.g., Facebook Live or via messaging/conferencing applications). The rapid growth is clearly visible from RAN information such as PRB utilization as a first RAN KPI and number of users as a second RAN KPI, wherein trend analysis leads to prediction of the congestion in the near future (see FIGS. 11A and 11B). Traffic and user experience analysis shows the underlying service traffic mix and the role of outgoing video streams, while saturation implies the unwanted user experience impact (in terms of aggregated terabytes data traffic in the downlink, see FIG. 11C).

Figure 11D:
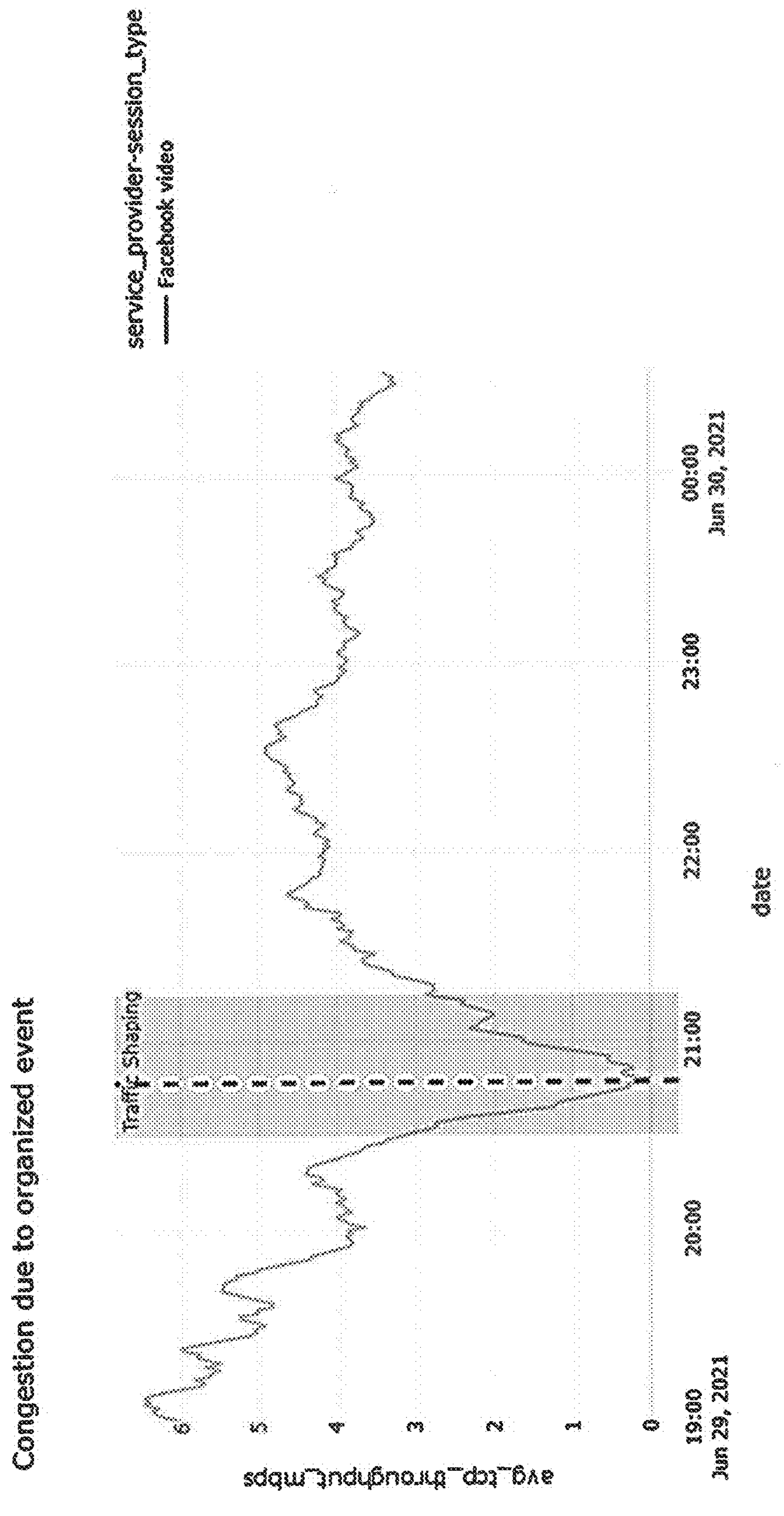

Shaping the mainly contributing video traffic is the straightforward closed-loop congestion mitigation action to protect the RAN domain from congestion. Monitoring the throughput distribution per service shows the impact of targeted traffic shaping in the feedback loop, and helps to dynamically find the optimal settings. In addition, core network nodes (such as PCRF/PCF) might prioritize VIP subscribers, keeping their video streams alive, even if non-VIP subscribers are subject to traffic shaping to avoid congestion. Feedback is crucial for the closed-loop action, and here one observes how sustained throughput is restored even for the most impacted video streaming traffic (see FIG. 11D).

Scenario 4: Traffic Jam Due to Highway Incident (STC)

Another cell congestion scenario is a sudden traffic jam due to an accident and the subsequent road closure on a highway. This scenario is an example for a service-specific congestion mitigation action for prioritizing specific service types which are important in the congestion situation.

Figure 12A:
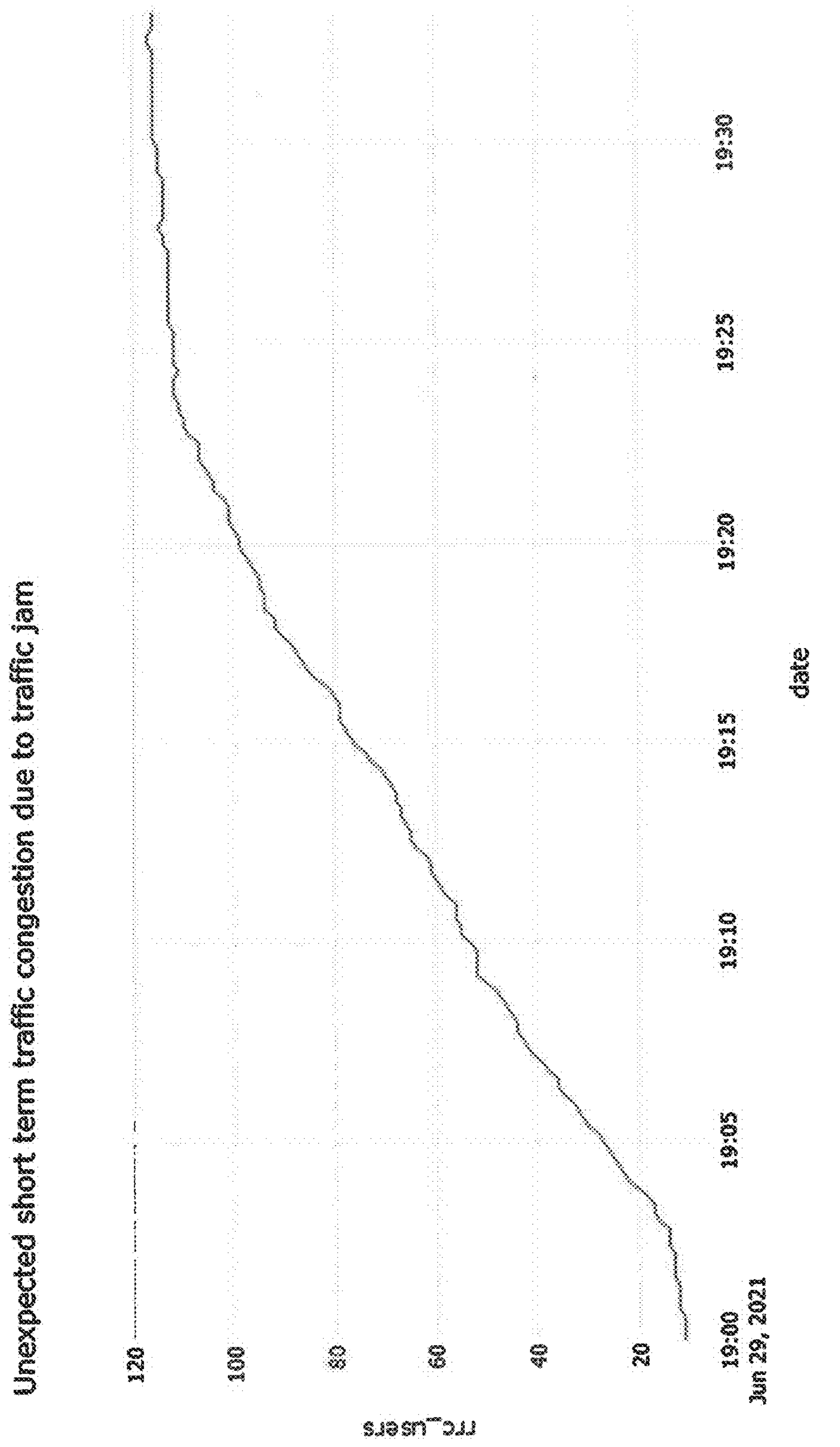

In the area of the serving cell, typically a low number of (high velocity) users are passing with short temporary visits. However, suddenly a large number of users are stopping and staying in the cell, with a significant portion of the users starting voice calls to emergency and road services, or to re-organize the rest of the day. As a result, a sudden increase in the RRC user count as exemplary RAN KPI is observed, and short-term congestion prediction is activated (see FIG. 12A).

Congestion, especially on the control plane, is causing increased Call Setup Time and lower Call Setup Success Ratio, as exemplary RAN KPIs. Once voice services are prioritized over data traffic as a congestion mitigation action, those are restored: typically VoLTE/VoNR traffic is protected from other data traffic. However, beyond VoLTE/VoNR services, in such scenarios, the operator might wish to prioritize "over the top" voice and video messaging services (e.g., Viber, Teams or Facebook Messenger) over other, bandwidth hungry services. Such a prioritization is enabled by per-session traffic analysis in terms of the underlying services.

Figure 12B:
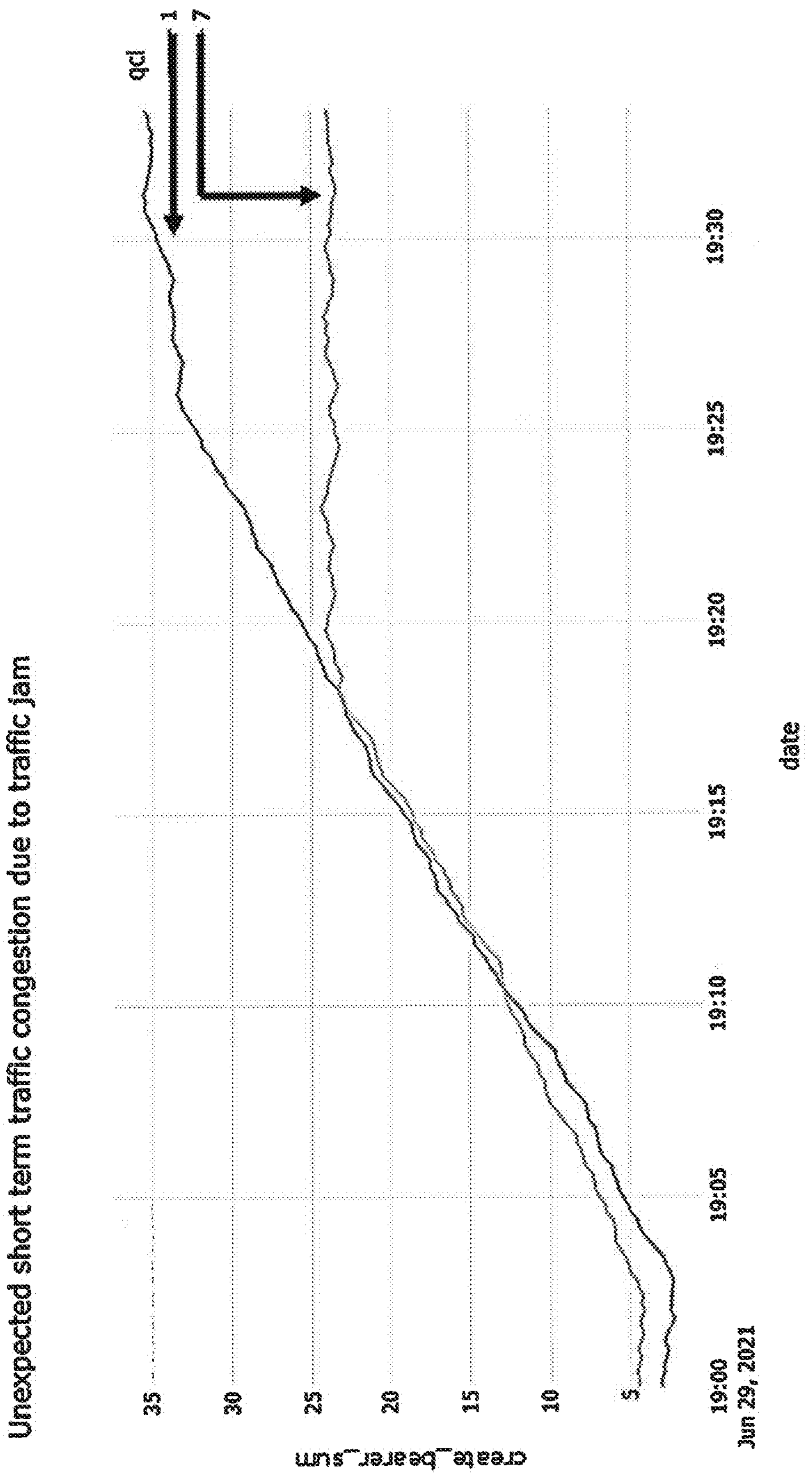

One option for a closed-loop congestion mitigation action in such a scenario is shown on FIG. 12B: prioritizing communication services (e.g., voice services) over typical mobile broadband (MBB) entertainment services (e.g., video or audio streaming) results the latter to saturate when the cell gets congested, and leaves room for voice and video calls. In FIG. 12B, QCI stands for Quality of Service Class Identifier. The value of this parameter helps to distinguish services in terms of voice (e.g., VoLTE) and MBB traffic. VoLTE traffic is always served by a bearer that has QCI=1; MBB traffic is always served by a bearer that has QCI=5-9 (one of those values).

Figure 12C:
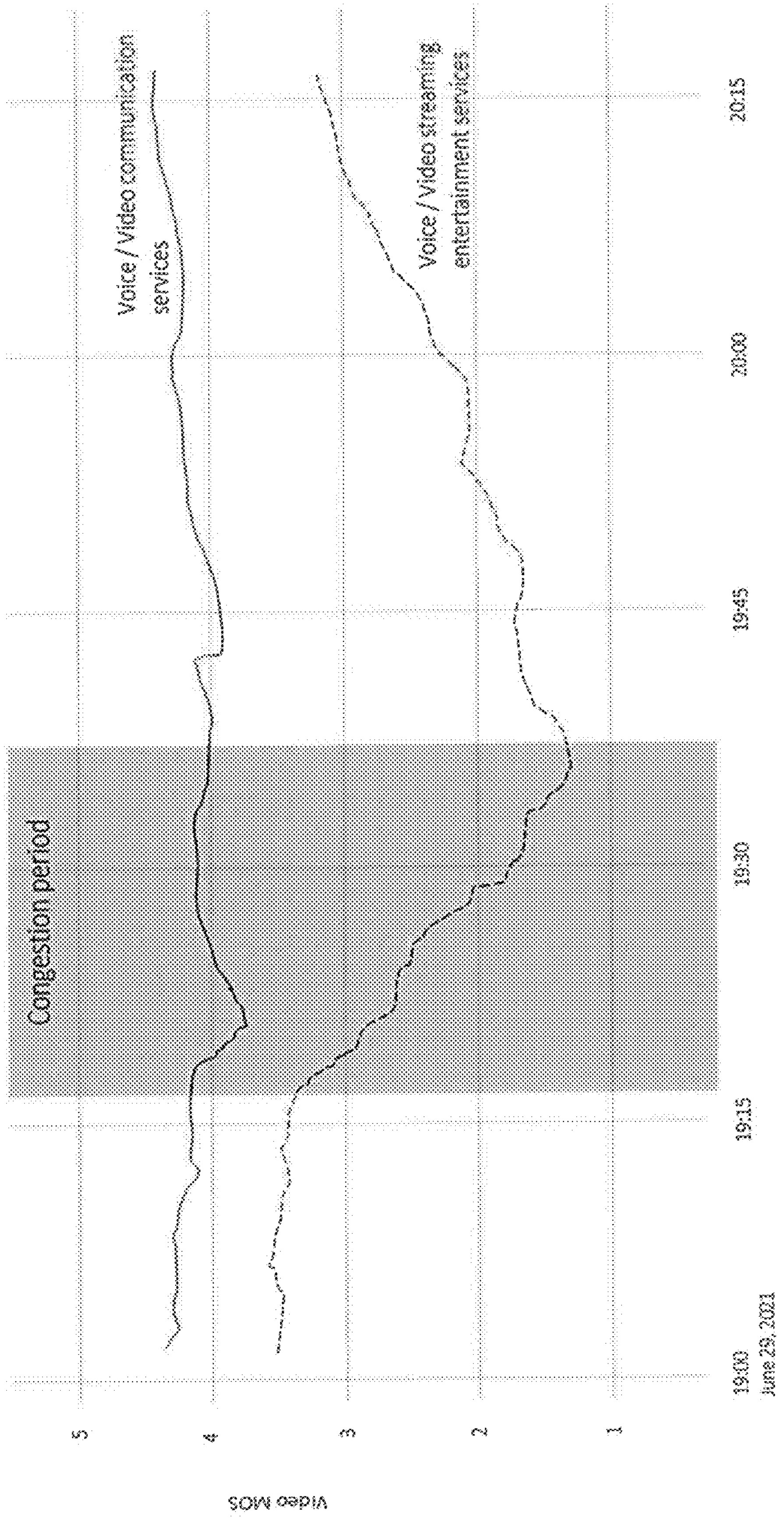

Continuous monitoring of QoS/QoE impact drives the adaptive closed-loop traffic priority settings: as time goes by, instantaneous voice calls are more and more replaced by audio and video streaming services accessed by users stuck in the traffic jam. FIG. 12C illustrates how video MOS degrades for such streaming services, while the video MOS can be maintained for communication services. The video MOS for streaming services gets restored after the congestion period, as cell load permits.

As has become apparent from the above description of exemplary implementation scenarios, O-RAN-related cell congestion detection and prediction procedures may be extended with correlation of information from the RAN and core network domains. An O-RAN-focussed congestion evaluation approach (e.g., based on RAN counters and associated RAN KPIs) may initially be used for predicting candidate cells for which congestion can become an issue in the future. In a later phase, per-session real-time quality monitoring in the core network domain can be triggered for the candidate cells only. Using, for example, a cell filtering function (e.g., of a packet core performance monitoring function), event report generation for one or both of user and control planes in the core network domain may be limited to the candidate cells. In some variants, a per-session analytics system correlates user plane events, control plane events and RAN events into per-session correlated records, which may be further enriched with cell and/or subscriber reference data. Based on the possibly enriched records derived on a per-session basis, service traffic may individually be classified and quality indicators may be derived for different service types.

In cells where a quality degradation is experienced for specific services and/or subscriber groups, congestion mitigation actions may be triggered (e.g., based on the inference derived from the standard RAN counters). The per-session monitoring may be continued to verify the effect of any congestion mitigation action in congested cells (e.g., in a closed-loop manner).

The technique presented herein, such as the correlation apparatus 200, may be implemented in an O-RAN component, such a CPM rApp. Use Case 16 in O-RAN.WG1.Use-Cases-Analysis-Report-v-06-00 may be extended (e.g., as an "option c)" or otherwise) to define that the CPM component can trigger the core network domain to start one or more congestion mitigation actions (e.g., per subscriber and/or per service). Such congestion mitigation actions in the core network domain may in certain variants be more effective than congestion mitigation actions limited to the RAN domain.

The invention claimed is:

1. A method of triggering one or more congestion mitigation actions in a communication network, the communication network comprising a core network domain and a cellular radio access network, RAN, domain having an Open RAN, O-RAN, architecture, the method comprising:

evaluating a temporal behavior of at least one congestion indicator for individual cells in the RAN domain to identify one or more candidate cells that are prone to suffering from congestion;

correlating, for at least one of the one or more candidate cells, session-related information from the core network domain with RAN information from the RAN domain to derive at least one quality indicator for the at least one candidate cell; and triggering, dependent on the at least one quality indicator derived for the at least candidate cell, one or more congestion mitigation actions.

2. The method of claim 1, comprising:

receiving the RAN information via a first interface of an O-RAN Service Management and Orchestration, SMO, framework.

3. The method of claim 2, wherein:

at least the correlation step is performed by the O-RAN SMO framework, and comprising receiving the session-related information via a second interface of the O-RAN SMO framework from the core network domain.

4. The method of claim 2, wherein:

at least the correlation step is performed by a server external to the O-RAN SMO framework, and comprising receiving the RAN information via a third interface of the O-RAN SMO framework by the server, the method further comprising receiving, by the server external to the O-RAN SMO framework, the session-related information from the core network domain via a fourth interface of the server.

5. The method of claim 1, comprising:

correlating, after at least one of the one or more congestion mitigation actions has been triggered, fresh session-related information with fresh RAN information to derive at least one fresh quality indicator; and determining, based on the at least one fresh quality indicator, if the at least one congestion mitigation action needs to be modified.

6. The method of claim 1, comprising:

triggering, responsive to determining that the at least one candidate cell is prone to suffering from congestion, monitoring in the core network domain of the session-related information for the at least one candidate cell.

7. The method of claim 1, wherein:

at least a first of the one or more congestion mitigation actions is triggered to be performed in the core network domain, wherein the communication network is configured to transport service traffic for different services, and wherein the first of the congestion mitigation actions comprises service traffic shaping.

8. The method of claim 1, wherein:

the communication network is configured to transport service traffic for a first service and for a second service, and wherein the at least one quality indicator is derived separately for the first service and for the second service, the at least one congestion mitigation action is triggered when the at least one quality indicator derived for the at least candidate cell fulfills at least one degradation criterion, and there exist different degradation criteria for the first service and the second service.

9. The method of claim 1, wherein:

the communication network is configured to transport service traffic for a first service and for a second service, and wherein a second of the one or more congestion mitigation actions is triggered for the first service and not triggered for the second service, and a third of the one or more congestion mitigation actions is triggered for the second service and not triggered for the first service, or wherein no congestion mitigation action is triggered for the second service.

10. The method of claim 1, wherein:

at least a fourth of the one or more congestion mitigation actions is triggered to be performed in the RAN domain, wherein the RAN domain is configured to transport service traffic for a first service on a first radio bearer or channel and is further configured to transport service traffic for a second service on a second radio bearer or channel, and wherein the fourth of the one or more congestion mitigation actions is triggered for the first radio bearer or channel and not triggered for the second radio bearer or channel, wherein a fifth of the one or more congestion mitigation actions is triggered for the second radio bearer or channel and not triggered for the first radio bearer or channel, or wherein no congestion mitigation action is triggered for the second radio bearer or channel.

11. The method of claim 1, wherein:

the communication network is configured to provide communication services on a subscription basis to a first subscriber set and to a second subscriber set, and wherein a sixth of the one or more congestion mitigation actions is triggered for the first subscriber set and not for the second subscriber set, wherein a seventh of the one or more congestion mitigation actions is triggered for the second subscriber set and not triggered for the first subscriber set, or wherein no congestion mitigation action is triggered for the second subscriber set, wherein at least one of the sixth and the seventh congestion mitigation action is triggered to be performed in the core network domain.

12. The method of claim 11, comprising:

correlating the session-related information with subscription information to derive the at least one quality indicator separately for the first subscriber set and the second subscriber set;

wherein, as an option, the at least one congestion mitigation action is triggered when the at least one quality indicator derived for the at least candidate cell fulfills at least one degradation criterion and wherein there exist different degradation criteria for the first subscriber set and the second subscriber set.

13. The method of claim 1, wherein:

correlating the session-related information with the RAN information comprises associating session-related information gathered in the core network domain for a particular session with RAN information gathered in the RAN domain for or during the particular session.

14. The method of claim 1, wherein:

evaluating the temporal behavior of the at least one congestion indicator comprises a temporal extrapolation of the at least one congestion indicator.

15. The method of claim 1, wherein:

the RAN information comprises at least one of RAN node statistics and RAN node counter information, or the RAN information relates to at least one of physical resource block utilization, throughput, number of users, cell trace events, and radio resource control-related information.

16. The method of claim 1, wherein:

evaluating the temporal behavior of the at least one congestion indicator comprises performing at least one of i. a short-term prediction for a time period of less than an hour; and ii. a long-term prediction for a time period of more than an hour, wherein:

in the context of long-term prediction, regular fluctuations in the RAN information are filtered out;

in the context of long-term prediction for a possible candidate cell, RAN information gathered for at least one neighboring cell of the possible candidate cell is evaluated; or in the context of short-term prediction, a probabilistic model is applied or cell trace events are evaluated.

17. The method of claim 1, wherein:

evaluating the temporal behavior of the at least one congestion indicator comprises applying a machine learning algorithm.

18. The method of claim 1, comprising:

performing a root cause analysis for each of the one or more candidate cells; and selecting, based on a result of the root cause analysis, at least one of the one or more congestion mitigation actions to be triggered.

19. A non-transitory computer-readable medium storing thereon computer-readable program code that, executed by at least one processor, causes at least one processor to perform:

evaluating a temporal behavior of at least one congestion indicator for individual cells in a cellular radio access network, RAN, domain having an Open RAN, O-RAN, architecture to identify one or more candidate cells that are prone to suffering from congestion;

correlating, for at least one of the one or more candidate cells, session-related information from a core network domain with RAN information from the RAN domain to derive at least one quality indicator for the at least one candidate cell; and triggering, dependent on the at least one quality indicator derived for the at least candidate cell, one or more congestion mitigation actions.

20. An apparatus for triggering one or more congestion mitigation actions in a communication network, the communication network comprising a core network domain and a cellular radio access network, RAN, domain having an Open RAN, O-RAN, architecture, the apparatus being configured to:

evaluate a temporal behavior of at least one congestion indicator for individual cells in the RAN domain to identify one or more candidate cells that are prone to suffering from congestion;

correlate, for at least one of the one or more candidate cells, session-related information from the core network domain with RAN information from the RAN domain to derive at least one quality indicator for the at least one candidate cell; and trigger, dependent on the at least one quality indicator derived for the at least candidate cell, one or more congestion mitigation actions.

* * * * *